US010351704B2

(12) United States Patent
Nishida et al.

(10) Patent No.: US 10,351,704 B2
(45) Date of Patent: Jul. 16, 2019

(54) SULFUR-CONTAINING POLYORGANOSILOXANE COMPOSITIONS AND RELATED ASPECTS

(71) Applicant: Dow Corning Corporation, Midland, MI (US)

(72) Inventors: Fumito Nishida, Midland, MI (US); Steven Swier, Midland, MI (US); Yanhu Wei, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 15/518,332

(22) PCT Filed: Nov. 6, 2015

(86) PCT No.: PCT/US2015/059373
§ 371 (c)(1),
(2) Date: Apr. 11, 2017

(87) PCT Pub. No.: WO2016/077159
PCT Pub. Date: May 19, 2016

(65) Prior Publication Data
US 2017/0306150 A1 Oct. 26, 2017

Related U.S. Application Data

(60) Provisional application No. 62/079,059, filed on Nov. 13, 2014.

(51) Int. Cl.
| | |
|---|---|
| *C08L 83/08* | (2006.01) |
| *C08K 5/36* | (2006.01) |
| *C08K 5/372* | (2006.01) |
| *C08G 77/12* | (2006.01) |
| *C08G 77/20* | (2006.01) |
| *C08G 77/28* | (2006.01) |
| *B01J 23/40* | (2006.01) |
| *C08K 5/378* | (2006.01) |
| *C08K 5/39* | (2006.01) |
| *C08K 5/40* | (2006.01) |
| *C08K 5/38* | (2006.01) |
| *C08K 5/375* | (2006.01) |
| *C08G 77/16* | (2006.01) |

(52) U.S. Cl.
CPC .............. *C08L 83/08* (2013.01); *B01J 23/40* (2013.01); *C08G 77/12* (2013.01); *C08G 77/20* (2013.01); *C08G 77/28* (2013.01); *C08K 5/36* (2013.01); *C08K 5/372* (2013.01); *C08K 5/3725* (2013.01); *C08G 77/16* (2013.01); *C08K 5/375* (2013.01); *C08K 5/378* (2013.01); *C08K 5/38* (2013.01); *C08K 5/39* (2013.01); *C08K 5/40* (2013.01)

(58) Field of Classification Search
CPC ........ C08K 5/37; C08K 5/372; C08K 5/3725; C08K 5/375; C08K 5/378; C08K 5/38; C08K 5/39; C08K 5/40; C08L 83/04
USPC .......................... 524/332, 588; 525/477–479
See application file for complete search history.

(56) References Cited

U.S. PATENT DOCUMENTS

| | | | |
|---|---|---|---|
| 4,113,696 A * | 9/1978 | Williams | C07F 7/1836 523/213 |
| 4,260,726 A | 4/1981 | Deubzer et al. | |
| 4,269,963 A | 5/1981 | Homan et al. | |
| 5,063,102 A | 11/1991 | Lee et al. | |
| 5,254,656 A | 10/1993 | Bilgrien et al. | |
| 5,548,006 A * | 8/1996 | Hirabayashi | C08K 5/0025 524/100 |
| 5,691,401 A | 11/1997 | Morita et al. | |
| 5,998,548 A | 12/1999 | Brennenstuhl et al. | |
| 6,191,297 B1 | 2/2001 | Batz-Sohn et al. | |
| 6,384,125 B1 | 5/2002 | Bergstrom et al. | |
| 6,416,869 B1 | 7/2002 | van Ooij et al. | |
| 6,456,964 B2 | 9/2002 | Manjunath et al. | |
| 6,737,531 B1 | 5/2004 | Dioumaev et al. | |
| 6,759,486 B2 | 7/2004 | Luginsland et al. | |
| 7,078,460 B2 | 7/2006 | Ikeno et al. | |
| 7,176,269 B2 | 2/2007 | Hakuta et al. | |
| 7,687,635 B2 | 3/2010 | Verpoort et al. | |
| 7,754,829 B2 | 7/2010 | Kimura | |
| 7,763,739 B2 | 7/2010 | Kadyrov et al. | |
| 7,776,611 B2 | 8/2010 | Crudden et al. | |
| 8,258,251 B2 | 9/2012 | Meador et al. | |
| 8,709,596 B2 | 4/2014 | Jauer et al. | |
| 8,957,147 B2 | 2/2015 | Swier et al. | |
| 9,133,280 B2 | 9/2015 | Evans et al. | |
| 9,464,172 B2 | 10/2016 | Ide et al. | |

(Continued)

FOREIGN PATENT DOCUMENTS

| | | |
|---|---|---|
| CN | 191371523 A | 3/2009 |
| CN | 103665887 | 3/2014 |

(Continued)

OTHER PUBLICATIONS

CN103665887 machine translation.
CN103725010 machine translation.
JP2002129004 machine translation.
JP2003041224 machine translation.
JP2003192724 machine translation.
JP2007231195 machine translation.
JP2014084351 machine translation.

(Continued)

*Primary Examiner* — Marc S Zimmer
(74) *Attorney, Agent, or Firm* — John J. Piskorski

(57) ABSTRACT

Described are hydrosilylation-curable polyorganosiloxane compositions containing sulfur, including hydrosilylation-curable polyorganosiloxane prepolymers and hydrosilylation-cured polyorganosiloxane polymer products made therefrom, as well as methods of preparing and using the same, devices comprising or prepared from the same, and sulfur-functional organosiloxanes useful therein.

11 Claims, 1 Drawing Sheet

(56) References Cited

U.S. PATENT DOCUMENTS

| | | |
|---|---|---|
| 2002/0192528 A1 | 12/2002 | Sixt et al. |
| 2006/0178495 A1 | 8/2006 | van Ooij |
| 2008/0160317 A1 | 7/2008 | Haitko |
| 2010/0292428 A1 | 11/2010 | Meador et al. |
| 2010/0310492 A1 | 12/2010 | Stalet et al. |
| 2012/0245272 A1 | 9/2012 | Dent et al. |
| 2014/0005431 A1* | 1/2014 | Hirokami ............... C08K 5/548 556/427 |

FOREIGN PATENT DOCUMENTS

| | | |
|---|---|---|
| CN | 103725010 | 4/2014 |
| JP | 09194593 A | 7/1997 |
| JP | 2002129004 | 5/2002 |
| JP | 2003041224 | 2/2003 |
| JP | 2003192724 | 7/2003 |
| JP | 2007231195 | 9/2007 |
| JP | 2014084351 | 5/2014 |
| WO | 20130029090 A1 | 3/2013 |
| WO | WO 2013/138089 * | 9/2013 |
| WO | 2014124389 | 8/2014 |

OTHER PUBLICATIONS

Nazarchuk, et al, "Synthesis and properties of polysiloxane xerogels containing tetrasulfide groups", Russian Journal of Inorganic Chemistry, Nov. 2012, pp. 1496-1505, vol. 57, No. 11.
Search report for corresponding Europe Application No. 15 85 8244 dated Oct. 18, 2018.

* cited by examiner

SULFUR-CONTAINING POLYORGANOSILOXANE COMPOSITIONS AND RELATED ASPECTS

CROSS REFERENCE TO RELATED APPLICATIONS

This application is a U.S. national stage filing under 35 U.S.C. § 371 of PCT Application No. PCT/US15/059373 filed on 6 Nov. 2015, currently pending, which claims the benefit of U.S. Provisional Patent Application No. 62/079,059 filed 13 Nov. 2014 under 35 U.S.C. § 119 (e). PCT Application No. PCT/US15/059373 and U.S. Provisional Patent Application No. 62/079,059 are hereby incorporated by reference.

This invention generally relates to curable polyorganosiloxane compositions containing sulfur, cured polyorganosiloxane products made therefrom, as well as to methods of preparing and using the same, to devices comprising or prepared from the same, and to sulfur-functional organosiloxanes.

Hydrosilylation generally is an addition reaction between an SiH group of an SiH functional reactant and an aliphatically unsaturated group of an aliphatically unsaturated-functional reactant. The reaction forms a carbon-silicon bond between one of the carbon atoms of the aliphatically unsaturated group and the silicon atom of the SiH group. Depending on the nature of the reactants and reaction conditions (e.g., temperature, time period), the hydrosilylation may comprise as little as a single step chemical process of coupling of two reactants together, as in end-capping or chain extending oligomeric or polymeric organosiloxanes. Alternatively, the hydrosilylation may comprise a multi-step chemical process of converting a prepolymer or polymer into a polymer of higher molecular mass and then into a network. The multi-step chemical process is referred to as curing.

Curing of hydrosilylation curable organosiloxane compositions may be catalyzed by a metal hydrosilylation catalyst such as a platinum-containing catalyst. A hydrosilylation catalyst is susceptible to deactivation by various composition impurities, including sulfur compounds (U.S. Pat. No. 5,063,102). Certain sulfur compounds are used as catalyst poisons (U.S. Pat. No. 8,709,596 B2). At a super concentration in a curable composition containing a metal catalyst, a large excess molar amount of the sulfur compound relative to the molar amount of the metal over-coordinates the metal. This effectively blocks activation of the complex to a catalytic form and kills the curing reaction before it starts. Thus, unless a sulfur compound can somehow be sequestered away from the metal catalyst until the curing reaction is done (e.g., such as by grafting the sulfur compound onto a solid filler or by adding the sulfur compound to the composition after curing), super concentrations of sulfur compounds in curable compositions are, as a first instance, avoided in the art.

Various compounds have been mentioned as curing retarders for use with ordinary hydrosilylation curable organosiloxane compositions (JP 2014-084351 A). There, the curing retarder is said to be a component for adjusting the storage stability of the composition or for modulating hydrosilylation reactivity of the composition in a hardening process (i.e., a curing process). The curing retarder is used in an amount of from 0.1 mole to 1,000 moles, and preferably from 1 to 100 moles, per 1 mole of catalyst. The curing retarders are certain organophosphorus compounds, certain organic sulfur compounds, certain nitrogen-containing organic compounds, certain tin series compounds, certain organic peroxides, and certain organic compounds containing an aliphatic unsaturated bond. The organic sulfur compounds may be organo mercaptans, diorgano sulfide, a hydrogen sulfide, benzothiazole, thiazole, and a benzothiazole disulfide. The organosiloxane may be acyclic and/or cyclic. The organosiloxane, however, is not a resin-linear block copolymer and the curing retarder is not a sulfur-functional organosiloxane.

Curing inhibitors are used as optional additives for organosiloxane compositions. Examples of curing inhibitors include, among other compounds, certain sulfur compounds (e.g., US 2012/0245272 A1, paragraph [0082]; U.S. Pat. No. 5,691,401, column 7; U.S. Pat. No. 5,254,656, column 6; and JP 2007-231195 A, claim 7). For example, JP 2007-231195 A mentions butyl mercaptan, 1,1-dimethylethyl mercaptan, and dodecyl mercaptan as examples of the curing retarder (claim 7) in an organic peroxide curable composition. Morita and Sasaki (U.S. Pat. No. 5,691,401) used 3-mercaptopropyl-trimethoxysilane as a silane coupling agent (column 8). The organosiloxanes may be linear or branched, but are not a resin-linear block copolymer and the curing inhibitor is not a sulfur-functional organosiloxane.

Brennenstuhl et al. (U.S. Pat. No. 5,998,548) used a sulfur compound (C) in organosilicon compositions which can be crosslinked to form compressible elastomers. In addition to monofunctional units (M-type units) and difunctional units (D-type units), the organosilicon compositions may contain certain trifunctional units and/or tetrafunctional units, but the content of the trifunctional and tetrafunctional units should not significantly exceed 20 mole percent (mol %), and typically is less than 0.1 mol %, of all units in the organosilicon. Preferably, the sulfur compound (C) is an organic sulfur compound. The function of such organic sulfur compound is reproducibility of the compressive set after storage, which is postulated to be due to a lower crosslinking rate, which in turn is postulated to be due to the organic sulfur compound (column 8). For example, Brennenstuhl et al. used 3-mercaptopropyl-trimethoxysilane to treat fumed silica fillers used in certain aspects of the organosilicon compositions which can be crosslinked to form compressible elastomers. (Such organosilicon compositions also contained, among other things, a catalyst inhibitor, ethynylcyclohexanol; U.S. Pat. No. 5,998,548, Examples 1 and 5). The 3-mercaptopropyl-trimethoxysilane reacted with the fumed silica filler, thereby forming a mercapto-modified pyrogenic silicon dioxide (via a condensation reaction with hydroxyl groups on the surface of the fumed silica). Thus, the sulfur atom was contained in a functional group that was covalently bonded to the pyrogenic silicon dioxide. The organosilicon compositions may be linear or branched, but are not a resin-linear block copolymer and the sulfur compound (C) is not a sulfur-functional organosiloxane.

Dent et al. (US 2012/0245272 A1) used certain optional additives such as certain sulfur compounds such as alkylthiols such as octadecyl mercaptan and others as filler treating agents for treating metal fillers used in certain aspects of a polyorganosiloxane having clustered functional groups at the polyorganosiloxane chain terminals (US 2012/0245272 A1, paragraph 0143]). Such sulfur compounds would react with the metal, thereby forming a sulfur-functionalized metal filler wherein the sulfur atom is contained in a functional group that is tightly bound to the metal in the form of a metal-sulfur complex. Dent et al. have also used a mercapto-functional compound as an optional adhesion promoter (US 2012/0245272 A1, paragraph [0115]).

The polyorganosiloxane having clustered functional groups at the polyorganosiloxane chain terminals may be linear or branched, but is not a resin-linear block copolymer and the sulfur compounds are not a sulfur-functional organosiloxane.

Lee et al. (U.S. Pat. No. 5,063,102) used a certain mercaptoalkyl-substituted polyorganosiloxane or an organic mercaptan as a curing agent for curing organosiloxane compositions that cure in the presence of ultraviolet radiation. The organosiloxane compositions may be linear or branched, but are not a resin-linear block copolymer, the organic mercaptan is not a sulfur-functional organosiloxane, and the mercaptoalkyl-substituted polyorganosiloxane does not contain an internal sulfur atom in its backbone (between siloxane repeat units).

BRIEF SUMMARY OF THE INVENTION

Briefly, embodiments of the invention include:

A degradation-inhibited hydrosilylation-curable composition comprising the following constituents:

(i) a hydrosilylation-curable polyorganosiloxane prepolymer, (ii) a metal derived from a hydrosilylation catalyst, and (iii) a sulfur compound having a boiling point greater than 150 degrees Celsius (° C.);

wherein the atomic amount, in moles, of sulfur atoms of the sulfur compound is from 5 to 10,000 times greater than the atomic amount, in moles, of (ii) the metal derived from a hydrosilylation catalyst; and wherein the composition either has the hydrosilylation-curable polyorganosiloxane prepolymer (i-a), as described below, for constituent (i) or the composition has the sulfur compound (iii-a), as described below, for constituent (iii) or the composition has both constituents (i-a) and (iii-a):

(i-a) the hydrosilylation-curable polyorganosiloxane prepolymer is a hydrosilylation-curable resin-linear organosiloxane block copolymer comprising:

40 to 90 mole percent D-type units of the formula $[R^1_2SiO_{2/2}]$, 10 to 60 mole percent T-type units of the formula $[R^2SiO_{3/2}]$, 0.5 to 35 mole percent silanol groups [Si—OH];

wherein each $R^1$ and $R^2$ independently is a $(C_1-C_{30})$ hydrocarbyl that has 0 aliphatic unsaturated bond or a $(C_1-C_{30})$ hydrocarbyl which comprises at least 1 aliphatic unsaturated bond, wherein the hydrosilylation-curable resin-linear organosiloxane block copolymer comprises from 0.5 to 5 mole percent of the $(C_1-C_{30})$ hydrocarbyl comprising at least one aliphatic unsaturated bond;

wherein the D-type units $[R^1_2SiO_{2/2}]$ are arranged in linear blocks having an average of from 100 to 300 D-type units $[R^1_2SiO_{2/2}]$ per linear block and the T-type units $[R^2SiO_{3/2}]$ are arranged in non-linear blocks having a molecular weight of at least 500 grams per mole (g/mol), wherein at least 30 mole percent of the non-linear blocks are crosslinked with each other and wherein each linear block is linked to at least one non-linear block via a divalent linker comprising a D-type or T-type siloxane unit; and wherein the hydrosilylation-curable resin-linear organosiloxane block copolymer has a weight average molecular weight ($M_w$) of at least 20,000 g/mol; or (iii-a) the sulfur compound is a sulfur-functional organosiloxane of formula (I): $(R^3R^4R^5SiO_{1/2})_{a1}(R^3R^4SiO_{2/2})_{b1}(R^3SiO_{3/2})_{c1}(O_{3/2}Si-R^6-S-(S)_m-R^7-SiO_{3/2})_{d1}(SiO_{4/2})_{e1}$ (I), wherein subscript m is 0, 1, 2, or 3;

subscripts a1+b1+c1+d1+e1=1, a1 is from 0 to 0.5, b1 is from 0 to <1, c1 is from 0 to 1, d1 is from 0 to 1, and e1 is from 0 to 0.2;

wherein each of $R^3$, $R^4$, and $R^5$ independently is a $(C_1-C_{30})$ hydrocarbyl, a mercapto-functional ((HS)-functional) $(C_1-C_{30})$ hydrocarbyl, or a $(C_1-C_{30})$ heterohydrocarbyl containing a sulfide group, a disulfide group, a trisulfide group, or a tetrasulfide group; and wherein each of $R^6$ and $R^7$ independently is a bond, a $(C_1-C_{30})$ hydrocarbylene, or a $(C_1-C_{30})$ heterohydrocarbylene containing a sulfide group, a disulfide group, a trisulfide group, or a tetrasulfide group; and with the proviso that d1 is >0 or at least one of $R^3$, $R^4$, and $R^5$ independently is a mercapto-functional $(C_1-C_{30})$ hydrocarbyl or a $(C_1-C_{30})$ heterohydrocarbyl containing a sulfide group, a disulfide group, a trisulfide group, or a tetrasulfide group. The sum of the mole percent of all units (e.g., D-type units plus T-type units plus any other M and/or Q units) in the hydrosilylation-curable resin-linear organosiloxane block copolymer adds up to 100 mole percent. The mole percent of silanol groups [Si—OH] in the hydrosilylation-curable resin-linear organosiloxane block copolymer is given as an average per molecule.

A hydrosilylation-cured degradation-inhibited organosiloxane polymer product comprising a reaction product of hydrosilylation curing the degradation-inhibited hydrosilylation-curable composition. (The degradation-inhibited hydrosilylation-curable prepolymer, including the R-LOB Copolymers, of the inventive composition contain a certain, relatively low amount (0.5 to 5 mol %) of unsaturated aliphatic groups, which facilitate the hydrosilylation curing thereof.) The cured product comprises a hydrosilylation-cured degradation-inhibited organosiloxane polymer, such as a hydrosilylation-cured degradation-inhibited resin-linear organosiloxane block copolymer.

A method of making the hydrosilylation-cured degradation-inhibited organosiloxane polymer product, the method comprising hydrosilylation curing the degradation-inhibited hydrosilylation-curable composition to give the cured product.

An opto and/or electronic device comprising the degradation-inhibited hydrosilylation-curable composition or the hydrosilylation-cured degradation-inhibited organosiloxane polymer product.

A method of transmitting light and/or conducting heat, the method comprising irradiating and/or heating the hydrosilylation-cured degradation-inhibited organosiloxane polymer product of the opto and/or electronic device so as to transmit light and/or conduct heat through at least a portion of the hydrosilylation-cured degradation-inhibited organosiloxane polymer product. Alternatively, the method may irradiate or heat the degradation-inhibited hydrosilylation-curable composition.

A sulfur-functional organosiloxane of formula (I): $(R^3R^4R^5SiO_{1/2})_{a1}(R^3R^4SiO_{2/2})_{b1}(R^3SiO_{3/2})_{c1}(O_{3/2}Si-R^6-S-(S)_m-R^7-SiO_{3/2})_{d1}(SiO_{4/2})_{e1}$ (I), wherein subscripts m, a1, b1, c1, d1, and e1 and $R^3$ to $R^7$ independently are as defined above.

A hydrosilylation reactable composition comprising, among other constituents, the sulfur-functional organosiloxane of formula (I).

A thermally aged hydrosilylation-cured degradation-inhibited organosiloxane polymer product comprising a product of heating the degradation-inhibited hydrosilylation-curable composition at a temperature of from 100° to 300° C. for a period of time of at least 5 minutes to give the thermally aged hydrosilylation-cured degradation-inhibited organosiloxane polymer product.

The prepolymers, hydrosilylation-curable compositions containing the prepolymers and methods of making the cured product are useful for preparing the hydrosilylation-cured degradation-inhibited organosiloxane polymer products. The sulfur compound, including the sulfur-functional organosiloxane, is useful for inhibiting degradation (i.e., preventing, delaying onset of, or lessening extent of premature crosslinking and/or thermal- and/or photo-degradation) of the prepolymers, composition, and cured product, while allowing hydrosilylation curing of the prepolymers and composition. The degradation-inhibited hydrosilylation-curable compositions and the hydrosilylation-cured degradation-inhibited organosiloxane polymer products and thermally aged products prepared therefrom are useful for preparing the opto and/or electronic device. The opto and/or electronic device is useful in the method of transmitting light and/or conducting heat. The invention may have additional uses, including those unrelated to optical, lighting, and electronic applications.

BRIEF DESCRIPTION OF THE DRAWINGS

Embodiments of the invention and certain advantages may be illustrated and described by referring to the accompanying drawings.

DETAILED DESCRIPTION OF THE INVENTION

Figure 1:
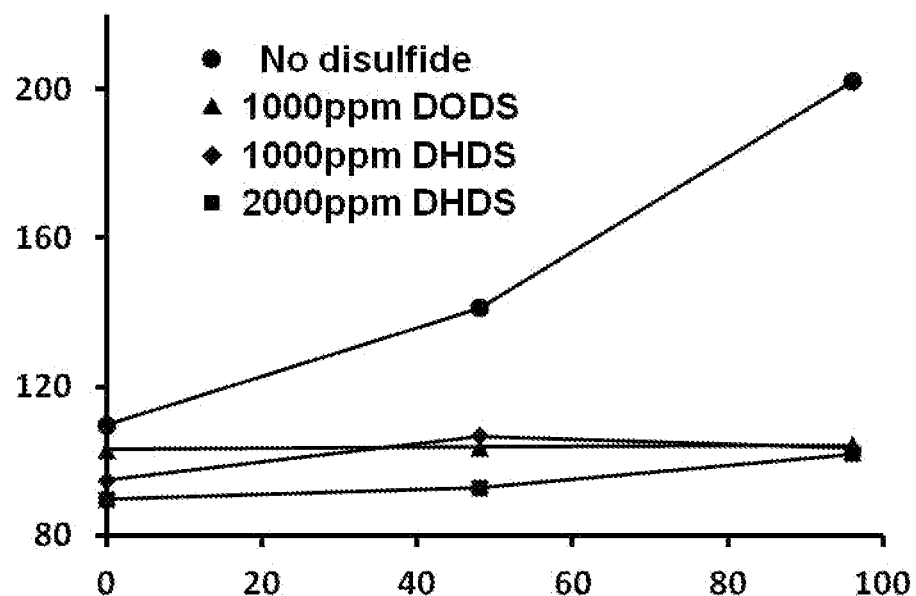
FIG. 1 shows modulus stability after thermal aging of three examples of the degradation-inhibited hydrosilylation-curable composition and of a comparative example, wherein modulus stability is inversely proportional to a change in Young's modulus.

The Brief Summary and Abstract are incorporated here by reference. The invention includes, but is not limited to, the embodiments summarized above.

We (the present inventors) have discovered or recognized technical problems with premature crosslinking, during storage, of hydrosilylation-curable polyorganosiloxane prepolymers such as hydrosilylation-curable resin-linear organosiloxane block copolymers (R-LOB Copolymers). We also discovered thermal and/or photo instability of hydrosilylation-curable compositions containing the hydrosilylation-curable polyorganosiloxane prepolymers as constituents. We have traced causes of the problems to the metal of the hydrosilylation catalyst that typically is used to synthesize the R-LOB Copolymers (via a hydrosilylation reaction). The metal is left in the R-LOB Copolymers and, when the R-LOB Copolymers are used in hydrosilylation-curable compositions, the metal undesirably facilitates the premature crosslinking or curing of the prepolymers at storage temperatures. We realized that the metal also undesirably facilitates thermal- and/or photo-degrading activity such as yellowing and/or embrittlement of the hydrosilylation-curable compositions and of cured products made therefrom, when they are exposed to heat and/or light. These problems have been difficult to diminish with inhibitor additives because the R-LOB Copolymers present a physical barrier to inhibiting the metal that ordinary organosiloxanes do not present. In the R-LOB Copolymers access of an inhibitor to the metal is impeded by different preferences of the metal and inhibitor for linear or resin blocks, preferences for different separated phases, or both, of the R-LOB Copolymers. We realized, for example, that in the R-LOB Copolymers, the inhibitor may prefer residing in the linear blocks and the metal may prefer residing in the non-linear blocks, or vice versa. Alternatively, the inhibitor may prefer residing in one nanophase and the metal may prefer residing in a different nanophase, or vice versa. Alternatively, the inhibitor and the metal may exhibit both of the foregoing different preferences. For these reasons, and due to the actions of sulfur compounds to poison metal catalysts, we did not expect these problems could be diminished using an additive, especially one that is a sulfur compound, especially an ordinary sulfur compound. After intense research we happily report our inventive solutions to these problems.

We have invented new and useful degradation-inhibited hydrosilylation-curable compositions. These compositions contain a polyorganosiloxane prepolymer, a metal, and a sulfur compound. The sulfur compound is sequestered from the metal in one or more new ways such that the compositions resist thermal- and/or photo-degrading activity such as yellowing and/or embrittlement, and yet are hydrosilylation-curable to give cured polyorganosiloxane polymer products. The cured products also resist thermal- and/or photo-degrading activity such as yellowing and/or embrittlement. We have also invented new and useful related aspects, such as the cured polyorganosiloxane polymer products prepared therefrom, as well as methods of preparing and using the same, and devices comprising or prepared from the same. We have also invented a new and useful sulfur-functional organosiloxane, which is especially effective for inhibiting degradation (i.e., premature crosslinking and/or thermal- and/or photo-degradation) of hydrosilylation-curable resin-linear organosiloxane block copolymers as well as of other types of hydrosilylation-curable organosiloxane prepolymer compounds. Our inventive technical solutions are described clearly and distinctly herein.

The degradation-inhibited, hydrosilylation-curable composition, the hydrosilylation-curable polyorganosiloxane prepolymer, the hydrosilylation-curable resin-linear organosiloxane block prepolymer, and the like are hydrosilylation curable materials. They may be prepared via a hydrosilylation reaction as described herein. They may be collectively referred to herein as "hydrosilylation-curable prepolymers." The hydrosilylation-curable prepolymers comprise macromolecules that contain some remaining or introduced hydrosilylation reactive groups, typically aliphatically unsaturated groups, more typically alkenyl groups, more typically vinyl-containing organic groups. The reactive groups may have been carried through intact from some of the aliphatically unsaturated group containing reactants (e.g., reactant (A) described later) used to synthesize the prepolymers, where the synthesis comprised incomplete hydrosilylation (e.g., where the mole ratio of SiH groups (e.g., in reactant (B) described later) to aliphatically unsaturated groups (e.g., in reactant (A) was less than 1:1. Alternatively the reactive groups may have been introduced into the prepolymer macromolecules after the hydrosilylation reaction used to synthesize the same. The prepolymer macromolecules are capable of entering, through these hydrosilylation reactive groups, into further polymerization and thereby contributing more than one structural unit to at least one type of chain (e.g., crosslinker) of the final (crosslinked or networked) hydrosilylation-cured degradation-inhibited organosiloxane polymer. The hydrosilylation-cured degradation-inhibited organosiloxane polymer may be a hydrosilylation-cured degradation-inhibited resin-linear organosiloxane copolymer.

Hydrosilylation-curable resin-linear organosiloxane block copolymers (R-LOB Copolymers). R-LOB Copolymers have a different monomer arrangement than those of non-block copolymers such as statistical, random or alternating copolymers. R-LOB Copolymers may be diblock, triblock, or higher block copolymers. R-LOB Copolymers are composed of macromolecules that are characterized by distinct linear blocks and distinct resin blocks. The linear blocks typically contain mostly, substantially all, or all D-type organosiloxane units, which are primarily bonded together to form bivalent straight chain polymeric segments (e.g., having from 10 to 400 units each), which bivalent straight chain polymeric segments are referred to herein as "linear blocks." The resin blocks contain a majority, substantially all, or all of T-type organosiloxane units or Q units, although typically they are T-type organosiloxane units. Typically, if there are any Q units ($SiO_{4/2}$) in the R-LOB Copolymer, they are relatively small in number (less than 5 mol % of all units). (In addition, the R-LOB Copolymers may contain a relatively small number* of M-type organosiloxane units ($R_3SiO_{1/2}$)—, wherein R is hydrocarbyl; *typically less than 5 mol % M-type units.) The T-type organosiloxane units are primarily bonded to each other to form polyvalent branched chain polymeric segments, which are referred to herein as "non-linear blocks." Thus, the R-LOB Copolymers are composed of macromolecules wherein the linear blocks are bonded to the non-linear blocks. In solid forms of the R-LOB Copolymer, a significant number of these non-linear blocks may aggregate together to form nano-domains. The aggregated non-linear blocks of the R-LOB Copolymers may be referred to as hard domains and the linear blocks as soft domains. The R-LOB Copolymers may be characterized by higher glass transition temperatures (Tg) than those of non-block copolymers. These R-LOB Copolymers may be designed to contain a low molar amount of unsaturated aliphatic groups, which enable cross-linking of the copolymers in downstream industrial applications such as sealing or encapsulating (opto)electronic devices. Some embodiments of these R-LOB Copolymers further contain an additional type of reactive group, which enables the R-LOB Copolymers so functionalized to be used in dual-cure mechanisms (described later). Some R-LOB Copolymers are of the nanophase-separated type, which comprise nano-sized domains of linear blocks predominantly comprised of D units and of resin blocks predominantly comprised of T units.

The invention has technical and non-technical advantages. We found that the inventive composition effectively diminishes technical problems with premature crosslinking of hydrosilylation-curable polyorganosiloxane prepolymers such as the hydrosilylation-curable resin-linear organosiloxane block copolymers, including nanophase-separated hydrosilylation-curable resin-linear organosiloxane block copolymers. The inventive composition also effectively diminishes problems with thermal and/or photo instability of hydrosilylation-curable polyorganosiloxane prepolymers and of the hydrosilylation-cured organosiloxane polymer products and thermally aged products prepared therefrom by hydrosilylation curing or thermal aging, respectively, such as the hydrosilylation-cured degradation-inhibited resin-linear organosiloxane block copolymer products prepared by hydrosilylation curing or thermal aging of the hydrosilylation-curable resin-linear organosiloxane block copolymers (R-LOB Copolymers). The inventive composition overcomes the physical barrier to inhibiting a metal in an R-LOB Copolymer, especially in a nanophase-separated R-LOB Copolymer. In the degradation-inhibited hydrosilylation-curable composition the sulfur compound inhibits the metal and prevents the hydrosilylation-curable polyorganosiloxane prepolymer such as the R-LOB Copolymer from premature crosslinking activity at storage temperatures. The sulfur compound also inhibits the metal and prevents the hydrosilylation-curable polyorganosiloxane prepolymer such as the R-LOB Copolymer from degrading such as yellowing and/or embrittlement when the inventive composition is exposed to heat and/or light. Also, the sulfur-functional organosiloxane is especially effective for inhibiting degradation (i.e., premature crosslinking and/or thermal- and/or photo-degradation) of the hydrosilylation-cured organosiloxane polymer in the hydrosilylation-cured degradation-inhibited organosiloxane polymer product, such as the hydrosilylation-cured resin-linear organosiloxane block copolymers in the hydrosilylation-cured degradation-inhibited resin-linear organosiloxane copolymer product. Beneficially, embodiments of the inventive composition balance three oft-competing properties: volatility of sulfur compound; solubility of sulfur compound in phase-separated silicone material; and crystallinity of sulfur compound. Certain aspects of this invention may independently effectively diminish additional problems and/or have other advantages.

Without being bound by theory, the hydrosilylation-curable compositions are believed to sequester constituent (iii) the sulfur compound in one or more new ways such that the sulfur compound enables the hydrosilylation-curable compositions and cured products made therefrom, to resist thermal- and/or photo-degrading activity such as yellowing and/or embrittlement, and yet the prepolymers and compositions remain hydrosilylation curable and capable of curing to give the cured products. The cured products contain (iii) the sulfur compound. In one way it is believed that the sulfur compound is physically sequestered in a different matter nanophase of constituent (i-a) than is the hydrosilylation catalyst. In another way the sulfur compound is covalently bonded to the organosiloxane of constituent (iii-a), which is itself a primary constituent of the hydrosilylation-curable composition or cured product (as opposed to being an optional additive that could dramatically affect the physical, mechanical, optical or chemical properties of the composition and cured product). In still another way different sulfur compounds are sequestered in two or more different ones of the foregoing ways.

So far the benefits of this invention seem to be greater in structural architectures associated with the present nanophase-separated hydrosilylation-curable resin-linear organosiloxane block copolymer than with ordinary, liquid-dispense phenyl and methyl organosiloxanes. These structural architectures are believed to be associated with the structural ordering of the D and T units in the R-LOB Copolymer. This surprising observation highlights our theory of an important contribution of solubility of the sulfur compound in the former architectures as a way to overcome the physical barrier mentioned earlier. Access of (iii) the sulfur compound to (ii) the metal in the inventive composition is enabled by the sulfur compound and the metal being mutually compatible with the structural architecture of the R-LOB Copolymer. The possibility exists that the sulfur compound forms a shell around the metal, and thus stabilizes the metal upon prolonged exposure to high temperature. Since the metals of typical hydrosilylation catalysts are liganded with vinyl methyl silicones, it may be that the metal and the sulfur compound reside in the linear phase of the hydrosilylation-curable resin-linear organosiloxane block copolymer and/or in the linear phase of the hydrosilylation-cured resin-linear organosiloxane block copolymer prepared therefrom by hydrosilylation curing thereof.

To illustrate some of the benefits of the inventive composition and cured product made therefrom, the storage modulus and/or Young's modulus of the inventive composition and cured product made therefrom is more stable—more resistant to degradation in heat (e.g., 225° C.) and air—than is that of an otherwise identical comparative composition except that it lacks or is free of the sulfur compound and the inventive cured product is more stable to heat and air than an otherwise identical and cured product made from the comparative composition. Upon exposure to heat and air, embrittlement of samples prepared from the inventive composition and cured product made therefrom was greatly reduced compared to embrittlement of samples prepared from the comparative composition and cured product made therefrom. In addition, color change (e.g., yellowing, e.g., an increase in CIE b* color value) was markedly suppressed by the inventive composition and cured product made therefrom relative to the comparative composition and cured product made therefrom. When the inventive and comparative compositions and cured products made therefrom contained a phenyl-silicon group, degradative generation of benzene was markedly suppressed by the inventive composition and cured product made therefrom. Further, the inventive composition and cured product made therefrom exhibited a more stable $D^{Ph}$ glass transition temperature relative to the comparative composition and cured product made therefrom, which indicates the inventive composition and cured product made therefrom is structurally more stable. Additionally, the elongation-at-break of the inventive composition and cured product made therefrom is more stable—more resistant to change in heat and air—than is that of an otherwise identical comparative composition and cured product made therefrom except that it lacks or is free of the sulfur compound.

Therefore, the inventive composition and cured product made therefrom is particularly useful in applications involving elevated temperatures and/or high irradiance levels for prolonged periods of time. Examples of such applications are opto and/or electronic devices such as LED devices, which may be operated continuously for hours at a time.

As will be evident from the detailed description of the invention that follows, however, the invention is not limited to applications involving elevated temperatures and/or high irradiance levels or in opto and/or electronic devices.

The description of this invention uses certain terms and expressions. For convenience some of them are defined herebelow.

As used herein, "may" confers a choice, not an imperative. "Optionally" means is absent, alternatively is present. "Contacting" means bringing into physical contact. "Operative contact" comprises functionally effective touching, e.g., as for modifying, coating, adhering, sealing, or filling. The operative contact may be direct physical touching, alternatively indirect touching. All U.S. patent application publications and patents referenced herein, or a portion thereof if only the portion is referenced, are hereby incorporated herein by reference to the extent that incorporated subject matter does not conflict with the present description, which would control in any such conflict. All % are by weight unless otherwise noted. All "wt %" (weight percent) are, unless otherwise noted, based on total weight of all ingredients used to make the composition, which adds up to 100 wt %. Any Markush group comprising a genus and subgenus therein includes the subgenus in the genus, e.g., in "R is hydrocarbyl or alkenyl," R may be alkenyl, alternatively R may be hydrocarbyl, which includes, among other subgenuses, alkenyl. The term "silicone" includes linear, branched, or a mixture of linear and branched polyorganosiloxane macromolecules.

As used herein, the abbreviations Alk means alkyl, Me means methyl, Et means ethyl, Pr means 1-propyl, iPr means isopropyl or 1-methylethyl, Bu means 1-butyl, Vi means vinyl, and Ph means phenyl. Halogen atom (or simply halogen) means F, Cl, Br, or I; alternatively F, Cl, or Br; alternatively F or Cl; alternatively F; alternatively Cl; alternatively Br; alternatively I.

The term "bivalent" means having two free valences. The term "bivalent" may be used interchangeably herein with the term "divalent." The term "polyvalent" means having two or more (e.g., three or four) free valences.

The term "degradation-inhibited" means a chemical decomposition resulting from exposure to heat, exposure to light (e.g., visible light), or exposure to both heat and light is prevented, or the onset of chemical decomposition is delayed, or the extent of chemical decomposition after a particular time period (e.g., 48 hours, 96 hours, or 500 hours) of said exposure is reduced compared to an extent of chemical decomposition that is not degradation inhibited after a same time period. The type of chemical decomposition comprises any one or more of oxidation (e.g., of an aliphatic unsaturated group, SiH group, or SiMe group), fragmentation (e.g., cleavage of a Ph-Si bond to generate benzene), discoloration (e.g., yellowing), increased molecular weight (e.g., cross-linking or chain extending), increased glass transition temperature ($T_g$), cracking or fracturing, and the like.

The expression "formula weight (FW) (in g/mol) normalized to moles of Si" or simply "FW (in g/mol) Si" is determined from silicon-29 nuclear magnetic resonance ($^{29}$Si-NMR) data, usually obtained in $d_6$-benzene. The $^{29}$Si-NMR data are used to calculate the mol % or mole fraction composition of M, D, T, and Q units in an organosiloxane, and then using the known formula weights of each of such units to calculate an average FW per Si atom. In a typical hydrosilylation-curable resin-linear organosiloxane block copolymer, there are different D and T units such as D(Vi), D(Ph,Me), T(alkyl), T(Ph), D(Vi,OZ), and D(OZ). The chemical shifts for D(Vi) and D(Ph,Me) are approximately in the range from −30 and −40 ppm, and usually overlap each other in most R-LOB Copolymers. The chemical shifts for T(Ph) are in the range from −75 to −85 ppm and those for T(alkyl) are in the range from −60 to −70 ppm. The chemical shifts for D(OZ) groups are in the range from −50 to −60 ppm and those for D(Vi, OZ) are in the range from −70 to −75 ppm. If desired, $^{13}$C-NMR data may be used to differentiate between D and T units with overlapping chemical shifts in the $^{29}$Si-NMR data.

Unless otherwise indicated as described below, the term "M unit" means a univalent organosiloxane group of formula $(CH_3)_3SiO_{1/2}$, the term "D unit" means a bivalent organosiloxane unit of formula $(CH_3)_2SiO_{2/2}$, the term "T unit" means a trivalent organosiloxane unit of formula $CH_3SiO_{3/2}$. The term "Q unit" means a tetravalent siloxane unit of formula $SiO_{4/2}$. When one or more of the methyl groups of the M units, one or both of the methyl groups of the D units, and/or the methyl group of the T units is/are replaced by one or more, respectively of a hydrogen atom, a halogen atom, hydroxyl group, a mercapto group, an organoheteryl group (e.g., (meth)acryloxy, dimethylamino, or methylsulfido), or an organyl group other than "methyl" (e.g., alkyl (which may include methyl), ethyl, phenyl, vinyl, $CF_3$—, or $CH_3C(=O)$—), the resulting units may be indicated in shorthand notation showing the replacement substituent in superscript. For example, when one of the methyl groups of the M unit is replaced by a vinyl (Vi) group, methoxy group, or a hydroxyl group, the unit is written as $M^{Vi}$, $M^{OMe}$, or $M^{OH}$, respectively; or using an alternative format as $M(Me_2,Vi)$, $M(Me_2,OMe)$, or $M(Me_2,OH)$, respectively; or simply as M(Vi), M(OMe), or M(OH), respectively. Likewise, when one of the methyl groups of the D unit is replaced by a vinyl (Vi) group, an alkyl group, or a phenyl group, the unit is written as $D^{Vi}$, $D^{Alk}$, or $D^{Ph}$, respectively; or using an alternative format as D(Me,Vi), D(Me,Alk), or D(Me,Ph), respectively; or simply is D(Vi), D(Alk), or D(Ph), respectively. Sometimes the comma may be inadvertently omitted and the unit may be written simply as D(MeVi), D(MeAlk), or D(MePh), respectively. Likewise when the methyl group of the T unit is replaced by a vinyl (Vi) group, a hydrogen atom, a chlorine atom, or a phenyl group, the unit is written as $T^{Vi}$, $T^{H}$, $T^{Cl}$, or $T^{Ph}$, respectively; or simply as T(Vi), T(H), T(Cl), or T(Ph), respectively.

The term "resin-linear" or "R-L" for short means a characteristic structure of a macromolecule or portion thereof, wherein the characteristic structure comprises a straight chain polymer block covalently bonded to a branched block of two or more branched units. The straight chain polymer block is linear and the branched block is non-linear.

As used herein "hydrosilylation-curable resin-linear organosiloxane block copolymer," "resin-linear organosiloxane block prepolymer," "R-LOB Copolymer" and "organosiloxane block copolymer" mean the same thing and refer to a macromolecule or collection of macromolecules as described above and further described herebelow. A macromolecule of an R-LOB Copolymer comprises a straight chain polymer block that is a linear segment consisting essentially of 10 or more D units and a branched (i.e., non-linear) block that consists essentially of 2 or more T units, respectively. The R-LOB Copolymer just one straight chain polymer block (linear block) and one branched block; alternatively the R-LOB Copolymer may contain two or more straight chain polymer blocks; alternatively the R-LOB Copolymer may contain two or more branched blocks; alternatively the R-LOB Copolymer may contain two or more straight chain polymer blocks and two or more branched blocks. The R-LOB Copolymer is referred to as being a "block" copolymer, as opposed to a non-block copolymer such as a random or an alternating copolymer. Each D unit independently may be the $[R^1_2SiO_{2/2}]$ unit and each T unit independently may be the $[R^2SiO_{3/2}]$ unit. The straight chain polymer blocks may aggregate to form a linear block-rich phase formed from linear blocks having D units in the R-LOB Copolymer. While the linear block is described as consisting essentially of 10 or more D units, one skilled in the art would recognize that in some embodiments the linear block may contain 0 T and 0 Q units (i.e., may consist of D units) or may contain a small quantity of T and/or Q units so long as at least 51 mol %, alternatively at least 75 mol %, alternatively at least 90 mol %, alternatively at least 99 mol % of the units of the linear block are the D units. As such, the organosiloxane may be considered as being "predominately" linear by having a majority of D ($R^1_2SiO_{2/2}$) siloxy units. The branched block may consist essentially of two or more T units that are covalently bonded primarily to each other to form "nano-domains." While the branched block is described as consisting essentially of two or more T units that are covalently bonded primarily to each other, the branched block may contain 0 D units and 0 Q units or may contain a small quantity of D and/or Q units so long as at least 51 mol % alternatively at least 75 mol %, alternatively at least 90 mol %, alternatively at least 99 mol % of the units of the branched block are the T units. In some aspects a significant number of these T units or non-linear blocks further aggregate to form "nano-domains," and some or all of the resulting R-LOB Copolymer may be a solid. In some embodiments, the nano-domains form a resin-rich phase in the R-LOB Copolymer. When the R-LOB Copolymer comprises both a linear block-rich phase and a resin-rich phase, the resin-rich phase is physically distinct from the linear block-rich phase.

The inventive composition may employ any (i) hydrosilylation-curable polyorganosiloxane prepolymer. The invention is described herein in an illustrative manner often referring to embodiments wherein the prepolymer is the R-LOB Copolymer. The prepolymer (i) such as the R-LOB Copolymers contain a certain, relatively low amount (0.5 to 5 mol %) of unsaturated aliphatic groups that enable hydrosilylation curing thereof, and of the embodiments of the degradation-inhibited hydrosilylation-curable compositions containing the R-LOB Copolymers. That is, from 0.5 to 5 mol % of hydrocarbyl groups (e.g., $R^1$ and $R^2$) in the R-LOB Copolymers are unsaturated aliphatic groups and the remaining hydrocarbyl groups (i.e., from 95 to 99.5 mol %, respectively, of hydrocarbyl groups) in the R-LOB Copolymers do not contain (i.e., lack or are free of) aliphatic unsaturated groups. The R-LOB Copolymer may comprise from 0.5 to <5 mol %, alternatively from 0.7 to 4.5 mol %, alternatively from 1 to 3 mol %, alternatively from 3 to 5 mol % of the unsaturated aliphatic groups. An unsaturated aliphatic group is a hydrocarbyl containing at least one aliphatic unsaturated bond, i.e., and least one carbon-carbon double bond (C=C) or carbon-carbon triple bond (C≡C). Examples of unsaturated aliphatic groups are ($C_2$-$C_{30}$)hydrocarbyl groups comprising at least one C=C or C≡C bond and include vinyl, propynyl, butenyl, vinyl-substituted phenyl, phenyl-substituted vinyl, and the like. This relatively low amount (0.5 to 5 mol %) of unsaturated aliphatic groups such as alkenyl groups such as vinyl-containing organic groups such as vinyl, propen-3-yl, or buten-4-yl enables the R-LOB Copolymers to be cured via hydrosilylation or via hydrosilylation and at least one other cure mechanism different than hydrosilylation. Thus, some R-LOB Copolymers are useful with a single cure mechanism of hydrosilylation and other R-LOB Copolymers are useful with "dual cure" mechanisms. In embodiments encompassing R-LOB Copolymers having dual cure mechanisms, hydrosilylation can be one cure mechanism and at least a second cure mechanism may be a condensation cure mechanism, Diels-Alder cure, azide-alkyne cycloaddition cure, radical cure, UV or radical acrylate cure, UV epoxy cure, Michael addition, and all reactions that are classified as "click chemistry." In those embodiments encompassing R-LOB Copolymers having dual cure mechanisms, in addition to the unsaturated aliphatic groups, the R-LOB Copolymers may also comprise reactive functionality for enabling the second or more cure mechanism. Examples of the other reactive functionality are silanol groups (SiOH), epoxide groups (e.g., oxiranyl, substituted oxiranyl), cyanate ester groups, azide alkyne groups, and the like.

A prepolymer (i) such as the R-LOB Copolymer with the relatively low amount (0.5 to 5 mol %) of unsaturated aliphatic groups have significantly faster cure speeds, relative to their condensation curable counterparts. The faster cure occurs when the R-LOB Copolymer with unsaturated groups is mixed with an SiH cross-linker and Pt cure catalyst, and the mixture is subjected to hydrosilylation curing. Significantly faster can be defined based on an oscillatory shear melt rheology measurement. Time to tan delta (Tan δ)=1 is used to define cure speed with lower numbers constituting faster cure. Significantly faster would mean more than 50% faster. The faster cure speed has enabled encapsulating and curing electronic devices, such as light-emitting diodes (LED), with high throughput, thereby lowering the total cost of the manufacturing process and assisting in general adoption of solid state lighting. LED chip devices also typically contain tall structures like the chip and diode, which are particularly challenging to encapsulate, for example, by lamination processes. Tall structures may have a height from 10 to 300 micrometers (μm, micrometers, commonly "microns"), or higher. The inventive composition and cured product made therefrom are useful for encapsulating tall structures. The cure speed is also tunable. That is, the cure speed can be increased or decreased by increasing or decreasing, respectively, the loading (concentration) of the hydrosilylation catalyst. A tunable cure speed system can offer the level of control needed to be successful in adopting manufacturing process to encapsulating and curing of different electronic devices, which may present unique time and temperature limitations. The R-LOB Copolymer may also exhibit, among other things, a low tack and a high shelf stability resulting from it having a relatively high resin glass transition temperature ($T_g$). Low tack may be qualitatively determined by placing a finger with low force onto a film of the R-LOB Copolymer and determining resistance to pulling the finger off the film. High shelf stability means that a film of the R-LOB Copolymer that is stored at a storage temperature (e.g., 20° to 30° C.) exhibits a melt shear modulus at 150° C. that does not change by more than 50% over a storage period of three weeks (when test samples of the film are measured). A relatively high $T_g$ means a glass transition temperature of at least 50° C., alternatively at least 60° C.; the $T_g$ may be less than 500° C. The R-LOB Copolymer, as well as curable and solid compositions comprising or prepared from the same, described herein include, may also exhibit good dissipative or stress relaxation behavior, which assists in stress dissipation in LED devices, and may have the ability to accommodate phosphor particles without detrimental impact on cure speed. Good dissipative or stress relaxation behavior is characterized by a tan delta (Tan δ) over an entire temperature range of interest (e.g., 25° to 250° C.) that is higher than 0.05. Accommodating phosphor particles without detrimental impact on cure speed means that the cure speed after addition of phosphor particles does not change by more than 50% compared to cure speed before addition of phosphor particles, wherein cure speed is measured as the time to tan delta=1.

Unless otherwise indicated, the term "solvent" means a liquid capable of dissolving a solute, e.g., an organic solvent or a silicone fluid (SFD). The solvent typically has a boiling point of from 34° C. to 150° C. and may be aprotic, alternatively protic (e.g., neutral aprotic). Examples of aprotic organic solvents are hydrocarbons (e.g., cyclohexane, heptane, toluene, or xylenes), carboxylic esters (e.g., ethyl acetate or butyl acetate), nitriles (acetonitrile), ketones (e.g., acetone or methyl ethyl ketone (MEK)), and ethers (e.g., diethyl ether, dibutyl ether, or ethylene glycol dimethyl ether). Examples of neutral protic organic solvents are alcohols (e.g., methanol, ethanol, or isopropanol). Examples of silicone fluids are polydimethylsiloxane fluids having a degree of polymerization (DP) of from 1 to 10 (e.g., M-$D_p$-M, wherein p is an integer from 1 to 10. The terms "substantially solvent-free" and "substantially solvent free" each mean a material that either lacks solvent (0 wt % solvent) or contains a trivial amount of solvent. The trivial amount is a quantity that does not affect in a negative manner a physical or chemical property of the material which contains it. For example, the trivial amount may be from >0 to <1 wt %, alternatively from >0 to <0.1 wt %, alternatively from >0 to <0.01 wt %, alternatively from >0 to 100 parts per million (ppm), alternatively from >0 to <20 ppm, alternatively from >0 to <10 ppm solvent.

The term "SiOZ" is a total of silicon-bonded hydroxyl and silicon-bonded O-hydrocarbyl groups. E.g., SiOH, SiOMe, SiOEt, SiOPr, SiOiPr, and the like, wherein Me is methyl, Et is ethyl, Pr is propyl, and iPr is isopropyl (i.e., 1-methylethyl).

The term "univalent" means having one free valence. The term "univalent" may be used interchangeably herein with the term "monovalent." The term "univalent organic group" means an organyl or an organoheteryl. The term "univalent organic group" may be used interchangeably herein with the term "monovalent organic group."

It is convenient to number certain aspects of the present invention. The invention includes, but is not limited to, any one or more of the following numbered aspects.

Aspect 1. The degradation-inhibited hydrosilylation-curable composition described above.

Aspect 2. The composition of aspect 1 wherein the composition has the hydrosilylation-curable polyorganosiloxane described as constituent (i-a).

Aspect 3. The composition of aspect 2 wherein the hydrosilylation-curable resin-linear organosiloxane block copolymer comprises 1 to 35 mole percent silanol groups; or the hydrosilylation-curable resin-linear organosiloxane block copolymer comprises 12 to 22 mole percent silanol groups; or the hydrosilylation-curable resin-linear organosiloxane block copolymer has a $M_w$ of 40,000 g/mol to 250,000 g/mol; or the hydrosilylation-curable resin-linear organosiloxane block copolymer comprises 30 to 60 mole percent T-type units of the formula [$R^2SiO_{3/2}$]; or the hydrosilylation-curable resin-linear organosiloxane block copolymer comprises from 0.5 to 4.5 mole percent of the ($C_1$-$C_{30}$)hydrocarbyl comprising at least one aliphatic unsaturated bond; or the hydrosilylation-curable resin-linear organosiloxane block copolymer comprises 12 to 22 mole percent silanol groups; the hydrosilylation-curable resin-linear organosiloxane block copolymer has a $M_w$ of 40,000 g/mol to 250,000 g/mol; the hydrosilylation-curable resin-linear organosiloxane block copolymer comprises 30 to 60 mole percent T-type units of the formula [$R^2SiO_{3/2}$]; and the hydrosilylation-curable resin-linear organosiloxane block copolymer comprises from 0.5 to 4.5 mole percent of the ($C_1$-$C_{30}$)hydrocarbyl comprising at least one aliphatic unsaturated bond.

Aspect 4. The composition of aspect 2 or 3 wherein the sulfur compound is a diorgano polysulfide of formula (II): $R^a$—S—$(S)_n$—$R^b$ (II), wherein subscript n is 1, 2, or 3, each of $R^a$ and $R^b$ independently is an unsubstituted ($C_2$-$C_{30}$) hydrocarbyl or a ($C_1$-$C_{30}$)hydrocarbyl substituted with 1 or more substituents $R^C$, wherein each $R^C$ independently is halogen, —$NH_2$, —NHR, —$NR_2$, —$NO_2$, —OH, —OR, oxo (=O), —C≡N, —C(=O)—R, —OC(=O)R, —C(=O)OH, —C(=O)OR, —SH, —SR, —SSH, —SSR, —SC(=O)R, —$SO_2R$, —$OSO_2R$, —$SiR_3$, or —$Si(OR)_3$; wherein each R independently is an unsubstituted ($C_1$-$C_{30}$) hydrocarbyl.

Aspect 5. The composition of aspect 4 wherein the diorgano polysulfide is of formula (II-a): R$^a$—S—S—R$^b$ (II-a), wherein each of R$^a$ and R$^b$ independently is as defined above.

Aspect 6. The composition of aspect 4 or 5 wherein the diorgano polysulfide is of formula (II-b): R$^a$—S—S—S—R$^b$ (II-b), wherein each of R$^a$ and R$^b$ independently is as defined above.

Aspect 7. The composition of aspect 4, 5, or 6 wherein the diorgano polysulfide of formula (II-c): R$^a$—S—S—S—S—R$^b$ (II-c), wherein each of R$^a$ and R$^b$ independently is as defined above.

Aspect 8. The composition of aspect 5, 6, or 7 wherein each of R$^a$ and R$^b$ independently is a (C$_5$-C$_{20}$)alkyl or a (C$_6$-C$_{20}$)aryl.

Aspect 9. The composition of any one of the preceding aspects wherein the composition has the sulfur compound described as constituent (iii-a).

Aspect 10. The composition of aspect 9, wherein the sulfur compound is a sulfur-functional organosiloxane of formula (I-a): (R$^3$R$^4$SiO$_{2/2}$)$_b$(O$_{3/2}$Si—R$^6$—S—(S)$_m$—R$^7$—SiO$_{3/2}$)$_d$(I-a), wherein b is from <1.00 to 0.80, d is from >0 to 0.20, each R$^3$ independently is (C$_1$-C$_6$)alkyl, and each R$^4$ independently is a (C$_1$-C$_6$)alkyl, phenyl, (C$_2$-C$_6$)alkenyl, or (C$_2$-C$_6$)alkynyl; m is 0, 1, 2, or 3; and each of R$^6$ and R$^7$ independently is a bond or a (C$_1$-C$_{10}$)hydrocarbylene.

Aspect 11. The composition of aspect 10 wherein in formula (I-a) each R$^3$ independently is (C$_1$-C$_3$)alkyl and each R$^4$ independently is (C$_1$-C$_3$)alkyl or phenyl, with the proviso that on average, per molecule, at least one R$^4$ is phenyl; or in formula (I-a) m is 1; and each of R$^6$ and R$^7$ is a bond; or in formula (I-a) each R$^3$ independently is (C$_1$-C$_3$)alkyl and each R$^4$ independently is (C$_1$-C$_3$)alkyl or phenyl, with the proviso that on average, per molecule, at least one R$^4$ is phenyl; m is 1; and each of R$^6$ and R$^7$ is a bond.

Aspect 12. The composition of any one of the preceding aspects wherein the atomic amount, in moles, of the sulfur atoms of the sulfur compound is at least 5 times greater than the atomic amount, in moles, of (ii) the metal derived from a hydrosilylation catalyst.

Aspect 13. The composition of any one of the preceding aspects wherein, based on one million parts by weight of the composition, the amount of the sulfur compound is greater than 200 parts per million (ppm).

Aspect 14. The composition of aspect 13 wherein the amount of the sulfur compound is from 450 to 4,000 ppm in the composition. Alternatively, the amount of the sulfur compound is from 450 to 1,499 ppm in the composition. Alternatively, the amount of the sulfur compound is from 700 to 4,000 ppm in the composition.

Aspect 15. The composition of any one of the preceding aspects wherein the amount of the sulfur compound is a quantity that is sufficient to inhibit a rate of change of storage modulus (G'), wherein the rate is expressed in megapascals per hour (MPa/hour) and is inhibited by at least 50% when the composition is thermally aged at 225° C. and the storage modulus (G') is measured by Dynamic Mechanical Analysis.

Aspect 16. The composition of any one of the preceding aspects wherein the atomic amount of (ii) the metal derived from a hydrosilylation catalyst is from greater than 0 to 100 ppm.

Aspect 17. The composition of any one of the preceding aspects wherein (ii) the metal derived from a hydrosilylation catalyst is palladium, platinum, rhodium, ruthenium, or a combination of any two or more thereof.

Aspect 18. The composition of aspect 17 wherein (ii) the metal derived from a hydrosilylation catalyst is platinum or rhodium.

Aspect 19. The composition of aspect 18 wherein (ii) the metal derived from a hydrosilylation catalyst is platinum, and the atomic amount of platinum is from 0.1 to 5 ppm of the composition.

Aspect 20. The composition of any one of the preceding aspects wherein, not accounting for the mercapto-functional (C$_1$-C$_{30}$)hydrocarbyl, each hydrocarbyl is unsubstituted.

Aspect 21. The composition of any one of aspects 1 to 20 wherein, not accounting for the mercapto-functional (C$_1$-C$_{30}$)hydrocarbyl, at least one hydrocarbyl independently is substituted with 1 or more substituents R$^C$, wherein each R$^C$ independently is halogen, —NH$_2$, —NHR, —NR$_2$, —NO$_2$, —OH, —OR, oxo (=O), —C≡N, —C(=O)—R, —OC(=O)R, —C(=O)OH, —C(=O)OR, —SH, —SR, —SSH, —SSR, —SC(=O)R, —SO$_2$R, —OSO$_2$R, —SiR$_3$, or —Si(OR)$_3$; wherein each R independently is an unsubstituted (C$_1$-C$_{30}$)hydrocarbyl.

Aspect 22. The composition of any one of the preceding aspects wherein the amount of (iii) the sulfur compound is sufficient to inhibit degradation of the hydrosilylation-curable polyorganosiloxane prepolymer of the composition by at least 20 percent, as compared to degradation of a comparative composition lacking (being free of) the sulfur compound, when the composition is thermally aged at 225° C. for 48 hours, and then the resulting thermally aged product is tested at 23° and 120° C.; wherein the test measures any one or more of the following properties (a) to (e): (a) inhibition of a change of storage modulus (G') thereof, (b) inhibition of yellowing thereof, (c) when the hydrosilylation-curable polyorganosiloxane prepolymer is Si-phenyl functional, inhibition of Si-phenyl bond scission thereof as indicated by a change of concentration of benzene generated during heating thereof, (d) when the hydrosilylation-curable polyorganosiloxane prepolymer is D$^{Ph}$ unit-functional, inhibition of a change in glass transition temperature (T$_g$) of the D$^{Ph}$ units thereof, and (e) inhibition of a change of elongation-at-break thereof; wherein each change of the properties (a) to (e) independently is determined by comparing measurements of the said property taken first before any aging (at Time 0) and second after aging in air for 48 hours (Time 48 hours), alternatively 500 hours (Time 500 hours), at 225° C., and then testing at 23° and 120° C.

Aspect 23. The composition of any one of the preceding aspects with the proviso that (iii) the sulfur compound is not any one or more of: O,O'-dibenzamidodiphenyl disulfide; 2-benzothiazole disulfide; diethyl disulfide; 2,5-dimethyl-2,5-di(tertiary-butylperoxy)hexane disulfide (DBPH); (ii) a metal-containing sulfur compound, wherein the metal is germanium, tin, lead, arsenic, antimony, bismuth, selenium, tellurium, polonium, astatine, a lanthanoids, an actinoid, or a metal of any one of Groups 1 to 13 of the Periodic Table of the Elements; a phosphorous-containing sulfur compound; a silica-containing sulfur compound; and a thiocarbonyl-containing compound.

Aspect 24. A degradation-inhibited hydrosilylation-curable composition prepared by a process comprising hydrosilylation reacting a reactable composition comprising reactants (A) and (B), a catalyst (C), and constituent (D): (A) a polyorganosiloxane having on average per molecule at least two aliphatically unsaturated aliphatic groups; (B) a SiH functional organosiloxane crosslinker having on average at least two SiH functional groups per molecule; (C) a hydrosilylation reaction catalyst containing an atomic amount of a metal; and (D) a sulfur compound of the formula (I) or (II) containing an atomic amount of sulfur atoms, wherein the atomic amount, in moles, of sulfur atoms of the sulfur compound is from 5 to 10,000 times greater than the atomic amount, in moles, of the metal of the hydrosilylation catalyst; to give a degradation-inhibited hydrosilylation-curable composition of aspect 1 or 4, respectively. Alternatively, the (D) a sulfur compound is of formula (IV) as described later in aspect 42 and the process gives a degradation-inhibited hydrosilylation-curable composition of aspect 42. Constituent (D) is an embodiment of constituent (iii).

Aspect 25. The composition of aspect 24 wherein the SiH functional organosiloxane crosslinker is of formula (III): $R^{11}{}_2R^{12}SiO_{1/2}]_f[R^{11}R^{12}SiO_{2/2}]_g[R^{11}SiO_{3/2}]_h[R^{12}SiO_{3/2}]_i$ $[SiO_{4/2}]_j$ (III) wherein the subscripts f, g, h i, and j represent the mole fraction of each bracketed siloxy unit and are as follows: f is from 0 to 0.6, g is from 0 to 0.6, h is from 0 to 1, i is from 0 to 1, and j is from 0 to 0.6, with the provisos that g+h+i+j>0 and f+g+h+i+j=1; wherein each of $R^{11}$ and $R^{12}$ independently is H, or a $(C_1-C_{30})$hydrocarbyl free of aliphatic unsaturation, or a silane radical of the formula —$[R^8R^9Si]_k[R^8R^9SiH]$, wherein k is an integer from 0 to 10 and each of $R^8$ and $R^9$ independently is a H or a $(C_1-C_{30})$ hydrocarbyl free of aliphatic unsaturation; and wherein at least about 1 mole % of $R^{11}$ and/or $R^{12}$ are H or SiH containing silane radical.

Aspect 26. A degradation-inhibited hydrosilylation-curable composition prepared by a process comprising: contacting a sulfur-free mixture comprising a hydrosilylation-curable polyorganosiloxane prepolymer and an atomic amount of a metal derived from a hydrosilylation catalyst with a solution of a sufficient amount, relative to the atomic amount of the metal, of a sulfur compound of the formula (I) or (II) and a carrier for a period of time sufficient to infiltrate the hydrosilylation-curable polyorganosiloxane prepolymer with the sulfur compound to give a sulfur compound-containing mixture, and removing the carrier from the sulfur compound-containing mixture to give a degradation-inhibited hydrosilylation-curable composition of any one of aspects 1 to 25. Alternatively, the (D) a sulfur compound is of formula (IV) as described later in aspect 42 and the process gives a degradation-inhibited hydrosilylation-curable composition of aspect 42. Constituent (D) is an embodiment of constituent (iii).

Aspect 27. The composition of any one of the preceding aspects with the proviso that (iii) the sulfur compound is not any of: O,O'-dibenzamidodiphenyl disulfide; 2-benzothiazole disulfide; diethyl disulfide; 2,5-dimethyl-2,5-di(tertiary-butylperoxy)hexane disulfide (DBPH); a metal-containing sulfur compound, wherein the metal is germanium, tin, lead, arsenic, antimony, bismuth, selenium, tellurium, polonium, astatine, a lanthanoids, an actinoid, or a metal of any one of Groups 1 to 13 of the Periodic Table of the Elements; a phosphorous-containing sulfur compound; a silica-containing sulfur compound; and a thiocarbonyl-containing compound.

Aspect 28. The composition of any one of the preceding aspects for use as an encapsulant in an electronic device, an optical device, or an optoelectronic device.

Aspect 29. An electronic device comprising a heat-generating element and a heat sink or heat spreader disposed in heat receiving communication therewith, the heat sink or heat spreader comprising the composition of any one of aspects 1 to 28 and 42, alternatively comprising a hydrosilylation cured product made therefrom. Aspect 42 is described later.

Aspect 30. An optical device comprising a light-emitting element and an encapsulant or light guide disposed in light transmitting communication therewith, the encapsulant or light guide comprising the composition of any one of aspects 1 to 28 and 42, alternatively comprising a hydrosilylation cured product made therefrom. Aspect 42 is described later.

Aspect 31. An optoelectronic device comprising a light-emitting element and an encapsulant disposed in light transmitting and/or heat conducting communication therewith, the encapsulant comprising the composition of any one of aspects 1 to 28 and 42, alternatively comprising a hydrosilylation cured product made therefrom. Aspect 42 is described later.

Aspect 32. The optoelectronic device of aspect 30, wherein the light-emitting element is a light-emitting diode.

Aspect 33. The device of any one of aspects 29 to 31 wherein when the light-emitting element is emitting light and/or the heat-generating element is generating heat, the composition (alternatively the hydrosilylation cured product made therefrom) respectively experiences an operating temperature of greater than 100° C., an irradiance of greater than 30 Watts per square centimeter ($W/cm^2$), or both an operating temperature of greater than 100° C. and an irradiance of greater than 30 $W/cm^2$. The operating temperature and the irradiance may be measured at the surface of the heat-generating element and/or the light-emitting element, respectively, as the case may be. The composition (alternatively the hydrosilylation cured product made therefrom) may be in direct contact with the surface of the heat-generating element and/or the light-emitting element, respectively, and thus the composition (alternatively the hydrosilylation cured product made therefrom) may be directly exposed to, and experiencing the full effect(s) of, the foregoing operating temperature and/or irradiance, as the case may be. Alternatively, the composition (alternatively the hydrosilylation cured product made therefrom) may be spaced apart from, and in indirect contact with, the surface of the heat-generating element and/or light-emitting element. For example, there may be a gas layer (e.g., air or nitrogen gas) spaced between the composition and the heat-generating element and/or light-emitting element such that heat and/or light travels from the element through the gas layer to the composition (alternatively the hydrosilylation cured product made therefrom), which is thus indirectly heated and/or irradiated thereby.

Aspect 34. The device of aspect 31 wherein when the light-emitting element is emitting light and/or the heat-generating element is generating heat, the composition (alternatively the hydrosilylation cured product made therefrom) respectively experiences an operating temperature of 150° C. or higher, an irradiance of 50 $W/cm^2$ or higher, or both an operating temperature of 150° C. or higher and an irradiance of 50 $W/cm^2$ or higher.

Aspect 35. A method of irradiation, the method comprising powering the optoelectronic device of any one of aspects 29 to 31 such that the light-emitting element is emitting light and/or the heat-generating element is generating heat and the composition (alternatively the hydrosilylation cured product made therefrom) respectively experiences an operating temperature of 150° C. or higher, an irradiance of 50 $W/cm^2$ or higher, or both an operating temperature of 150° C. or higher and an irradiance of 50 $W/cm^2$ or higher.

Aspect 36. A method of preparing a degradation-inhibited hydrosilylation-curable composition, the method comprising either a process comprising hydrosilylation reacting a reactable composition comprising reactants (A) and (B), a catalyst (C), and constituent (D): (A) a polyorganosiloxane having on average per molecule at least two aliphatically unsaturated aliphatic groups; (B) a SiH functional organosiloxane crosslinker having on average at least two SiH functional groups per molecule; (C) a hydrosilylation reaction catalyst containing an atomic amount of a metal; and (D) a sulfur compound of the formula (I) or (II) containing an atomic amount of sulfur atoms, wherein the atomic amount, in moles, of sulfur atoms of the sulfur compound is from 5 to 10,000 times greater than the atomic amount, in moles, of (ii) the metal of the hydrosilylation catalyst; to give a degradation-inhibited hydrosilylation-curable composition of aspect 1 or 4, respectively; or a process comprising: contacting a sulfur-free mixture comprising a hydrosilylation-curable polyorganosiloxane prepolymer and an atomic amount of (ii) a metal derived from a hydrosilylation catalyst with a solution of a sufficient amount, relative to the atomic amount of the metal, of a sulfur compound of formula (I) or (II) and a carrier for a period of time sufficient to infiltrate the hydrosilylation-curable polyorganosiloxane prepolymer with the sulfur compound to give a sulfur compound-infiltrated hydrosilylation-curable polyorganosiloxane prepolymer and the carrier, and removing the carrier from the sulfur compound-infiltrated hydrosilylation-curable polyorganosiloxane prepolymer without removing the sulfur compound to give a degradation-inhibited hydrosilylation-curable composition of any one of aspects 1 to 25. Alternatively, the (D) a sulfur compound is of formula (IV) as described later in aspect 42 and the process gives a degradation-inhibited hydrosilylation-curable composition of aspect 42. Aspect 42 is described later. Constituent (D) is an embodiment of constituent (iii).

Aspect 37. A sulfur-functional organosiloxane of formula (I): $(R^3R^4R^5SiO_{1/2})_{a1}(R^3R^4SiO_{2/2})_{b1}(R^3SiO_{3/2})_{c1}(O_{3/2}Si-R^6-S-(S)_m-R^7-SiO_{3/2})_{d1}(SiO_{4/2})_{e1}$ (I), wherein subscript m is 0, 1, 2, or 3; subscripts a1+b1+c1+d1+e1=1, a1 is from 0 to 0.5, b1 is from 0 to <1, c1 is from 0 to 1, d1 is from 0 to 1, and e1 is from 0 to 0.2; wherein each of $R^3$, $R^4$, and $R^5$ independently is a $(C_1-C_{30})$hydrocarbyl, mercapto-functional ((HS)-functional) $(C_1-C_{30})$hydrocarbyl, or a $(C_1-C_{30})$heterohydrocarbyl containing a sulfide group, a disulfide group, a trisulfide group, or a tetrasulfide group; and wherein each of $R^6$ and $R^7$ independently is a bond, a $(C_1-C_{30})$hydrocarbylene, or a $(C_1-C_{30})$heterohydrocarbylene containing a sulfide group, a disulfide group, a trisulfide group, or a tetrasulfide group; and with the proviso that d1 is >0 or at least one of $R^3$, $R^4$, and $R^5$ independently is a mercapto-functional $(C_1-C_{30})$hydrocarbyl or a $(C_1-C_{30})$heterohydrocarbyl containing a sulfide group, a disulfide group, a trisulfide group, or a tetrasulfide group.

Aspect 38. A reactable composition comprising reactants (A) and (B), a catalyst (C), and constituent (D): (A) a polyorganosiloxane having on average per molecule at least two aliphatically unsaturated aliphatic groups; (B) a SiH functional organosiloxane crosslinker having on average at least two SiH functional groups per molecule; (C) a hydrosilylation reaction catalyst containing an atomic amount of a metal; and (D) a sulfur-functional organosiloxane of formula (I): $(R^3R^4R^5SiO_{1/2})_{a1}(R^3R^4SiO_{2/2})_{b1}(R^3SiO_{3/2})_{c1}(O_{3/2}Si-R^6-S-(S)_m-R^7-SiO_{3/2})_{d1}(SiO_{4/2})_{e1}$ (I), wherein subscript m is 0, 1, 2, or 3; subscripts a1+b1+c1+d1+e1=1, a1 is from 0 to 0.5, b1 is from 0 to <1, c1 is from 0 to 1, d1 is from 0 to 1, and e1 is from 0 to 0.2; wherein each of $R^3$, $R^4$, and $R^5$ independently is a $(C_1-C_{30})$hydrocarbyl, mercapto-functional ((HS)-functional) $(C_1-C_{30})$hydrocarbyl, or a $(C_1-C_{30})$heterohydrocarbyl containing a sulfide group, a disulfide group, a trisulfide group, or a tetrasulfide group; and wherein each of $R^6$ and $R^7$ independently is a bond, a $(C_1-C_{30})$hydrocarbylene, or a $(C_1-C_{30})$heterohydrocarbylene containing a sulfide group, a disulfide group, a trisulfide group, or a tetrasulfide group; and with the proviso that d1 is >0 or at least one of $R^3$, $R^4$, and $R^5$ independently is a mercapto-functional $(C_1-C_{30})$hydrocarbyl or a $(C_1-C_{30})$heterohydrocarbyl containing a sulfide group, a disulfide group, a trisulfide group, or a tetrasulfide group. Constituent (D) is an embodiment of constituent (iii).

Aspect 39. The reactable composition of aspect 38 wherein the atomic amount, in moles, of sulfur atoms of the sulfur-functional organosiloxane of formula (I) is from 5 to 10,000 times greater than the atomic amount, in moles, of (ii) the metal of the hydrosilylation catalyst.

Aspect 40. A thermally aged hydrosilylation-cured polymer product comprising a product of heating the composition of any one of aspects 1 to 28 at a temperature of from 100° to 300° C. for a period of time of at least 5 minutes to give the thermally aged hydrosilylation-cured polymer product.

Aspect 41. The thermally aged, degradation-inhibited hydrosilylation-cured polymer product of aspect 40, wherein the temperature is from 120° to 250° C.; the period of time is from 5 minutes to 5,000 hours; or the temperature is from 120° to 250° C. and the period of time is from 5 minutes to 5,000 hours. For example, the temperature may be from 140° or 230° C. (e.g., 150° or 225° C.). The time periods may be from 5 to 30 minutes, alternatively from 30 to 60 minutes, alternatively from 1 hour to 24 hours, alternatively from 24 to 96 hours, alternatively from 48 to 96 hours, alternatively from 100 to 200 hours, alternatively from 200 to 500 hours, alternatively from 500 to 1,000 hours, alternatively from 1,000 hours to 5,000 hours, alternatively from 30 minutes to 48 hours, alternatively from 48 to 500 hours.

Aspect 42. The composition of any one of aspects 2 to 8 wherein the sulfur compound is a mercapto group-containing hydrocarbon of formula (IV): $R^d$—SH (IV), wherein $R^d$ is an unsubstituted $(C_6-C_{30})$hydrocarbyl or a substituted $(C_5-C_{30})$hydrocarbyl that is substituted with 1 or more substituents $R^C$, wherein each $R^C$ independently is halogen, —NH$_2$, —NHR, —NR$_2$, —NO$_2$, —OH, —OR, oxo (=O), —C≡N, —C(=O)—R, —OC(=O)R, —C(=O)OH, —C(=O)OR, —SH, —SR, —SSH, —SSR, —SC(=O)R, —SO$_2$R, —OSO$_2$R, —SiR$_3$, or —Si(OR)$_3$; wherein each R independently is an unsubstituted $(C_1-C_{30})$hydrocarbyl.

Unexpectedly, we discovered that the mercapto group-containing hydrocarbon of formula (IV) has a balance of desirable properties for use in the inventive composition containing constituent (i-a) and the cured product made therefrom. The mercapto group-containing hydrocarbon of formula (IV) does not prevent hydrosilylation curing of the inventive composition containing constituent (i-a) to give the cured product, and yet it does function to beneficially stabilize the composition against said degradation. It also protects the cured product made therefrom. We did not predict this contradictory combination of properties ahead of time. Without being bound by theory, we think that while the mercapto group-containing hydrocarbon of formula (IV) may partially inhibit function of the hydrosilylation catalyst therein, it does not poison the catalyst and prevent the hydrosilylation curing, but after curing is completed the mercapto group-containing hydrocarbon of formula (IV) may sequester (ii) the metal of the hydrosilylation catalyst in a resin phase or linear phase, alternatively in a soft domain or hard domain, wherein the sequestered metal is kept physically separated from functional groups in the hydrosilylation-cured degradation-inhibited organosiloxane polymer product that are prone to degradation.

More remarkably, the diorgano disulfide of formula (II) has advantageous properties similar to, and typically better (more effective), than those of the mercapto group-containing hydrocarbon of formula (IV). That is, the diorgano disulfide of formula (II) is less prone to inhibit the hydrosilylation catalyst than is the mercapto group-containing hydrocarbon of formula (IV), and yet the diorgano disulfide of formula (II) may function even better to beneficially stabilize the composition, and the cured product made therefrom, against said degradation.

Each of said "hydrocarbyl" groups of the sulfur compound (e.g., the hydrocarbyl groups described herein for $R^a$, $R^b$, $R^C$ and $R^d$) independently may be (a) aliphatic or aromatic, (b) acyclic or cyclic, (c) saturated or unsaturated, (d) straight chain or branched chain, (e) monocyclic or polycyclic, or (f) any non-mutually exclusive combination of two or more of (a) to (e). In some embodiments each hydrocarbyl group independently is alkyl, alkenyl, alkynyl, cycloalkyl, or aryl; alternatively aryl, alkenyl or alkyl; alternatively alkyl or aryl, alternatively alkenyl or alkyl; alternatively alkyl. In some embodiments each unsubstituted hydrocarbyl group independently has a maximum number of carbon atoms of 28, alternatively 26, alternatively 24, alternatively 22, alternatively 20, alternatively 18. In some embodiments each substituted hydrocarbyl group independently has a maximum number of carbon atoms of 58, alternatively 50, alternatively 40, alternatively 30, alternatively 28, alternatively 26.

In some embodiments, such as when the composition has constituent (i-a), the sulfur compound is the diorgano polysulfide of formula (II-a) or (II-b); alternatively of formula (II-a) or (II-c); alternatively of formula (II-b) or (II-c); alternatively of formula (II-a); alternatively of formula (II-b); alternatively of formula (II-c); all as described above. Alternatively, the sulfur compound may be a combination of at least two different said diorgano polysulfide of formula (II-a) to (II-c). For example, the combination may be at least two different diorgano polysulfides of formula (II-a), alternatively at least two different diorgano polysulfides of formula (II-b), alternatively at least two different diorgano polysulfides of formula (II-c), alternatively at least one diorgano polysulfide of formula (II-a) and at least one diorgano polysulfide of formula (II-b) or (II-c); alternatively at least one diorgano polysulfide of formula (II-a) and at least one diorgano polysulfide of formula (II-b), alternatively at least one diorgano polysulfide of formula (II-a) and at least one diorgano polysulfide of formula (II-c), alternatively at least one diorgano polysulfide of formula (II-b) and at least one diorgano polysulfide of formula (II-c).

In some embodiments, such as when the composition has constituent (i-a), the sulfur compound is the diorgano polysulfide of formula (II) and each of $R^a$ and $R^b$ independently may be an unsubstituted $(C_2$-$C_{30})$hydrocarbyl, such as an unsubstituted $(C_2$-$C_{30})$alkyl or an unsubstituted $(C_6$-$C_{30})$aryl. Alternatively each of $R^a$ and $R^b$ independently may be an unsubstituted $(C_5$-$C_{30})$alkyl or an unsubstituted $(C_6$-$C_{20})$aryl. Alternatively at least one, alternatively each of $R^a$ and $R^b$ independently may be an unsubstituted $(C_4$-$C_{30})$alkyl; alternatively an unsubstituted $(C_4$-$C_{26})$alkyl; alternatively an unsubstituted $(C_6$-$C_{24})$alkyl. Alternatively at least one, alternatively each of $R^a$ and $R^b$ independently may be an unsubstituted $(C_6$-$C_{20})$aryl. Alternatively $R^a$ is an unsubstituted $(C_6$-$C_{24})$alkyl and $R^b$ is an unsubstituted $(C_6$-$C_{12})$aryl; alternatively an unsubstituted $(C_6$-$C_{12})$aryl.

In some embodiments, such as when the composition has constituent (i-a), the sulfur compound may be the mercapto group-containing hydrocarbon of formula (IV): $R^d$—SH (IV). In some embodiments of the sulfur compound of formula (IV), each $R^d$ independently may be an unsubstituted $(C_6$-$C_{30})$hydrocarbyl, such as an unsubstituted $(C_6$-$C_{30})$alkyl or an unsubstituted $(C_6$-$C_{30})$aryl. Alternatively each $R^d$ independently may be an unsubstituted $(C_6$-$C_{30})$alkyl; alternatively an unsubstituted $(C_{10}$-$C_{30})$alkyl; alternatively an unsubstituted $(C_{12}$-$C_{26})$alkyl; alternatively an unsubstituted $(C_{14}$-$C_{24})$alkyl; alternatively an unsubstituted $(C_6$-$C_{20})$aryl. Alternatively each $R^d$ independently is a substituted $(C_5$-$C_{30})$alkyl; alternatively a substituted $(C_{10}$-$C_{30})$alkyl; alternatively a substituted $(C_{12}$-$C_{26})$alkyl; alternatively a substituted $(C_{14}$-$C_{24})$alkyl; alternatively a substituted $(C_6$-$C_{20})$aryl; alternatively a substituted $(C_6$-$C_{20})$aryl; alternatively a substituted $(C_6$-$C_{12})$aryl. In some embodiments the sulfur compound is a combination of at least two different said mercapto group-containing hydrocarbon of formula (IV).

In some embodiments, such as when the composition has constituent (i-a), the sulfur compound may be a combination of at least one said diorgano polysulfide of formula (II): $R^a$—S—$(S)_n$—$R^b$ (II) (e.g., formula (II-a), (II-b), or (II-c)) and at least one said mercapto group-containing hydrocarbon of formula (IV). In some such embodiments, at least one of $R^a$ and $R^b$ in formula (II) may be the same as $R^d$ in formula (IV); alternatively both of $R^a$ and $R^b$ in formula (II) may be the same each other and as $R^d$ in formula (IV); alternatively both of $R^a$ and $R^b$ in formula (II) may be different than $R^d$ in formula (IV); alternatively each of $R^a$ and $R^b$ in formula (II) may be different than each other and different than $R^d$ in formula (IV).

In some embodiments at least one, alternatively one of $R^a$, $R^b$, and $R^d$ independently is an unsubstituted or substituted alkyl, wherein the alkyl is $(C_6$-$C_{30})$alkyl, $(C_{10}$-$C_{20})$alkyl, $(C_{20}$-$C_{30})$alkyl, $(C_{11}$-$C_{30})$alkyl, $(C_{12}$-$C_{30})$alkyl, $(C_{12}$-$C_{28})$alkyl, $(C_6)$alkyl, $(C_7)$alkyl, $(C_8)$alkyl, $(C_9)$alkyl, $(C_{10})$alkyl, $(C_{11})$alkyl, $(C_{12})$alkyl, $(C_{14})$alkyl, $(C_{14})$alkyl, $(C_{15})$alkyl, $(C_{16})$alkyl, $(C_{17})$alkyl, $(C_{18})$alkyl, $(C_{19})$alkyl, $(C_{20})$alky, $(C_{21})$alkyl, $(C_{22})$alkyl, $(C_{23})$alkyl, $(C_{24})$alkyl, $(C_{25})$alkyl, $(C_{26})$alkyl, $(C_{27})$alkyl, or $(C_{28})$alkyl. In some embodiments at least one, alternatively one of $R^a$, $R^b$, and $R^d$ independently is an unsubstituted or substituted aryl, wherein the aryl is a $(C_6$-$C_{12})$aryl, phenyl, naphthyl, or biphenyl.

In embodiments of the sulfur compound containing a substituted hydrocarbyl group, the substituted hydrocarbyl, such as the substituted alkyl or substituted aryl, independently has at least one substituent $R^C$ up to per substitution, wherein $R^C$ is as defined above. Typically, the number of substituents $R^C$ in any particular substituted hydrocarbyl group is from 1 to either 5 or per substitution, whichever is less; alternatively from 1 to either 4 or per substitution, whichever is less; alternatively from 1 to 3, alternatively 1 or 2, alternatively from 2 to either 5 or per substitution, whichever is less; alternatively 1; alternatively 2; alternatively 3.

In some embodiments of the sulfur compound containing a substituted hydrocarbyl group, at least one, alternatively each $R^C$ independently is an aprotic group selected from halogen, —$NR_2$, —$NO_2$, —OR, oxo (=O), —C≡N, —C(=O)—R, —OC(=O)R, —C(=O)OR, —SR, —SSR, —SC(=O)R, —$SO_2$R, —$OSO_2$R, —$SiR_3$, and —$Si(OR)_3$; wherein each R independently is an unsubstituted $(C_1$-$C_{30})$hydrocarbyl. In some embodiments at least one, alternatively each $R^C$ independently is a halogen, —$NR_2$, or —OR, wherein R is as defined above; alternatively a halogen; alternatively a fluorine, chlorine, or bromine; alternatively a fluorine or chlorine; alternatively a fluorine; alternatively a chlorine. In some embodiments at least one $R^a$, $R^b$, and $R^d$ is a substituted hydrocarbyl group, wherein at least one $R^C$ independently is —OR, wherein R is as defined above.

In some embodiments of the sulfur compound containing a substituted hydrocarbyl group, at least one, alternatively each $R^C$ independently is a protic group selected from —$NH_2$, —NHR, —OH, —C(=O)OH, —SH, and —SSH. In some embodiments at least one, alternatively each $R^C$ independently is a —$NH_2$, —NHR, —OH, —SH, or —SSH; alternatively —SH or —SSH. In some embodiments at least one, alternatively each R independently is unsubstituted ($C_1$-$C_4$)alkyl; alternatively at least one, alternatively each R independently is methyl, ethyl, propyl, 1-methylethyl, 1-butyl, 2-butyl, 2,2-dimethylethyl; alternatively methyl, ethyl, 1-methylethyl, or 1,1-dimethylethyl.

In some embodiments, such as when the composition has constituent (i-a), the sulfur compound is dioctadecyl disulfide, dioctadecyl trisulfide, or dioctadecyl tetrasulfide. Dioctadecyl disulfide is of the formula $CH_3(CH_2)_{17}SS(CH_2)_{17}CH_3$; dioctadecyl trisulfide is of the formula $CH_3(CH_2)_{17}SSS(CH_2)_{17}CH_3$; dioctadecyl tetrasulfide is of the formula $CH_3(CH_2)_{17}SSSS(CH_2)_{17}CH_3$. In some embodiments the sulfur compound is dihexyl disulfide, dihexyl trisulfide, or dihexyl tetrasulfide. In some embodiments the sulfur compound is hexyl octadec-1-yl disulfide, hexyl octadec-1-yl trisulfide, or hexyl octadec-1-yl tetrasulfide. Hexyl octadec-1-yl disulfide is of the formula $CH_3(CH_2)_5SS(CH_2)_{17}CH_3$; hexyl octadec-1-yl trisulfide is of the formula $CH_3(CH_2)_5SSS(CH_2)_{17}CH_3$; and hexyl octadec-1-yl tetrasulfide is of the formula $CH_3(CH_2)_5SSSS(CH_2)_{17}CH_3$. In some embodiments the sulfur compound is 1-octadecanethiol or docosan-1-yl. 1-Octadecanethiol is of the formula $CH_3(CH_2)_{17}SH$ and 1-docosanethiol is of the formula $CH_3(CH_2)_{21}SH$.

In some embodiments, such as when the composition has constituent (iii-a), the sulfur compound is a sulfur-functional organosiloxane of formula $(T^{C_3H_6S-})_{0.090}T^{Ph}_{0.910}$, wherein pairs of the $(T^{C_3H_6S-})$ units are bonded together via their sulfur atoms to comprise a divalent dimeric unit of formula $(T^{C_3H_6S-}-SC_3H_6T)$. Each $(T^{C_3H_6S-})$ unit is a T-type unit of formula —$(O_{3/2}Si-(C_3H_6)-S)$—, which may also be drawn as —$(S-(C_3H_6)-SiO_{3/2})$—.

In some embodiments when the composition has constituent (i-a), the sulfur compound is dihexyl disulfide; dioctadecyl disulfide; dioctadecyl trisulfide; dioctadecyl tetrasulfide; bis(2-butoxy-ethyl) disulfide; or 1-docosanethiol, or a combination of any two or more thereof; and when the composition has constituent (iii-a), the sulfur compound is a sulfur-functional organosiloxane of formula $(T^{C_3H_6S-})_{0.090}T^{Ph}_{0.910}$. In some embodiments the sulfur compound is any six of the sulfur compounds listed in the immediately foregoing Markush group (i.e., any one of the sulfur compounds is omitted (excluded or deleted) from the foregoing Markush group to arrive at a smaller Markush group of said any six sulfur compounds).

The hydrosilylation-curable resin-linear organosiloxane block copolymer and the hydrosilylation-cured resin-linear organosiloxane block copolymer independently may be a nanophase-separated material. It is believed that when or after the hydrosilylation-curable resin-linear organosiloxane block copolymer is combined with the sulfur compound of formula (I) or (II) to form the degradation-inhibited hydrosilylation-curable composition, thermal degradation, photodegradation, and photo-thermal degradation of the resulting composition is inhibited to a greater extent than for hydrosilylation-curable resin-linear organosiloxane block copolymers that are not nanophase-separated materials.

It is believed that the hydrosilylation-curable resin-linear organosiloxane block copolymer having a $M_w$ of >250,000 g/mol may give a material too close to a gel point to be useful in making the device. In some embodiments the $M_w$ is <250,000 g/mol.

The divalent linker comprising a D-type or T-type siloxane unit contains a backbone comprising an oxygen-silicon-oxygen bonding motif shown in the structural fragment, (—O—Si—)$_j$O—, wherein j is an integer from 1 to 1,000; alternatively from 2 to 100, alternatively from 2 to 10.

Typically, the catalyst in the inventive composition is that which had been used in, and carried over from, the hydrosilylation reaction process that produced the hydrosilylation-curable polyorganosiloxane prepolymer.

The atomic amount of (ii) the metal derived from a hydrosilylation catalyst is from greater than 0 to 100 ppm; alternatively at most 50 ppm, alternatively <25 ppm, alternatively <10 ppm, alternatively <5 ppm; alternatively any one of the foregoing maximum amounts and a minimum amount of >0.1 ppm, alternatively >0.5 ppm, alternatively >0.9 ppm. When the composition or the cured product made therefrom is used in optical transmittance applications, the metal may undesirably absorb light. Therefore, when the composition or the cured product made therefrom is used in optical transmittance applications, the atomic amount of the metal derived from a hydrosilylation catalyst is any amount that allows sufficient optical transmittance for a particular use. In some optical transmittance uses of the composition or the cured product made therefrom, the atomic amount of metal is less than 5 ppm.

Suitable R-LOB Copolymers may have linear blocks where the D units (i.e., $[R^1_2SiO_{2/2}]$ units) are primarily bonded together to form polymeric chains having an average of from 10 to 400 D units of formula $[R^1_2SiO_{2/2}]$ per linear block (e.g., an average of from 10 to 100 D units; from 100 to 400 D units; from 200 to 300 D units; or from 100 to 150 D units. The R-LOB Copolymers may have non-linear blocks of T units of formula $[R^2SiO_{3/2}]$ that have a number average molecular weight ($M_n$) of at least 500 g/mole and/or at least 30 wt % of the non-linear blocks are crosslinked with each other. The non-linear blocks may have a $M_n$ of at least 1000 g/mole, alternatively at least 4000 g/mole, alternatively at most 8000 g/mole. Of the non-linear blocks, at least 40 wt %; alternatively at least 60 wt %; alternatively at least 80 wt % of the non-linear blocks may be crosslinked with each other. The non-linear blocks may have a $M_n$ of at least 1000 g/mole, alternatively at least 4000 g/mole, alternatively at most 8000 g/mole; and at least 40 wt %; alternatively at least 60 wt %; alternatively at least 80 wt % of the non-linear blocks may be crosslinked with each other.

The crosslinking of the non-linear blocks may be accomplished via a variety of chemical mechanisms and/or moieties. For example, crosslinking of non-linear blocks within the block copolymer may result from the condensation of residual silanol groups present in the non-linear blocks of the copolymer. Alternatively, crosslinking of the non-linear blocks may result from hydrosilylation curing.

The R-LOB Copolymer may contain additional units such as M units, Q units, and/or other unique D or T units that have organic groups other than $R^1$ or $R^2$, respectively, provided that the R-LOB Copolymer contains the mole fractions of the D and T units as described herein the mol % of unsaturated aliphatic groups as described herein.

The R-LOB Copolymer may comprise from 0.5 to 4.5 mol %, alternatively from 1 to 4 mol %, alternatively from 2 to 3 mol %, alternatively from 1 to 5 mol % of the unsaturated aliphatic groups. Examples of unsaturated aliphatic groups are ($C_2$-$C_{30}$)hydrocarbyl groups comprising at least one C=C or C≡C bond.

In some embodiments, the R-LOB Copolymer also contain silanol groups (SiOH). The amount of silanol groups may be from 0.5 to 35 mol %, alternatively from 2 to 32 mol %, alternatively from 8 to 22 mol %, alternatively from 15 to 35 mol % silanol groups. The silanol groups may be present on any D, T, and optional M and Q unit within the R-LOB Copolymer. The majority (e.g., from 75 to <100 mol %, alternatively from 85 to <95 mol % alternatively from 75 to 85 mol %, of the silanol groups will reside on the T units, i.e., as [HOSiO$_{3/2}$] units in the resin component of the R-LOB Copolymer. Although not wishing to be bound by any theory, silanol groups present on the resin component of the R-LOB Copolymer allows for the R-LOB Copolymer to further react or condensation cure at elevated temperatures.

In the R-LOB Copolymer, each $R^1$ and $R^2$ independently may be a $(C_1-C_{30})$hydrocarbyl, alternatively a $(C_1-C_{20})$ hydrocarbyl, alternatively a $(C_1-C_{10})$hydrocarbyl, alternatively a $(C_1-C_6)$hydrocarbyl. Each hydrocarbyl group may independently comprise the unsaturated aliphatic group, alternatively be free of aliphatic unsaturation, with the proviso that at least some low mol % of the hydrocarbyl groups are the unsaturated aliphatic groups such that the R-LOB Copolymer has the low mol % of unsaturated aliphatic groups described herein. Examples of hydrocarbyl groups that contain the unsaturated aliphatic group are alkenyl and alkynl. Examples of alkenyl are $H_2C=CH-$, $H_2C=CHCH_2-$, $H_2C=C(CH_3)CH_2-$, $H_2C=CHC(CH_3)_2-$, $H_2C=CHCH_2CH_2-$, $H_2C=CHCH_2CH_2CH_2-$, and $H_2C=CHCH_2CH_2CH_2CH_2$. Examples of alkynyl are $HC\equiv C-$, $HC\equiv CCH_2-$, $HC\equiv CCH(CH_3)-$, $HC\equiv CC(CH_3)_2-$, and $HC\equiv CC(CH_3)_2CH_2-$. Examples of hydrocarbyl groups that are free of the unsaturated aliphatic group are alkyl, aryl, alkylaryl, and arylalkyl groups. Examples of suitable alkyl groups are methyl, ethyl, propyl, butyl, pentyl, and hexyl. Methyl is a preferred alkyl. Examples of aryl groups are phenyl, naphthyl, and anthryl groups. In the R-LOB Copolymer, each $R^1$ independently may be methyl, phenyl, vinyl, or on a same D unit one $R^1$ independently may be methyl and the other $R^1$ independently may be vinyl or phenyl. In the R-LOB Copolymer, each $R^2$ independently may be methyl, phenyl, or alkenyl (e.g., vinyl); or some $R^2$ independently may be methyl and the other $R^2$ independently may be alkenyl (e.g., vinyl) or phenyl. Also as mentioned herein some $R^2$ may be HO—.

Each hydrocarbyl independently may be unsubstituted or substituted with one or more substituents. Examples of suitable substituents are halogen, $-NH_2$, $-NHR$, $-NR_2$, $-NO_2$, $-OH$, $-OR$, oxo $(=O)$, $-C\equiv N$, $-C(=O)-R$, $-OC(=O)R$, $-C(=O)OR$, $-SH$, $-SR$, $-SSR$, $-SC(=O)R$, $-SO_2R$, $-OSO_2R$, $-SiR_3$, or $-Si(OR)_3$; wherein each R independently is hydrogen or an unsubstituted $(C_1-C_{30})$hydrocarbyl. Examples of suitable halogen are F, Cl, Br, or I; alternatively F, Cl, or Br; alternatively F or Cl; alternatively F, alternatively Cl.

The R-LOB Copolymer may have a weight average molecular weight ($M_w$) of at least 20,000 g/mole, alternatively a $M_w$ of at least 60,000 g/mole, alternatively a $M_w$ of at least 100,000 g/mole. The R-LOB Copolymer may have a $M_w \leq 250,000$ g/mole, alternatively from 40,000 to 250,000 g/mole, alternatively from 40,000 to 100,000 g/mole, alternatively from 100,000 to 250,000 g/mole. The R-LOB Copolymer may have a number average molecular weight ($M_n$) of from 15,000 to 50,000 g/mole; alternatively 15,000 to 30,000 g/mole; alternatively from 30,000 to 50,000 g/mole. The $M_w$ and $M_n$ may be readily determined using Gel Permeation Chromatography (GPC) techniques, such as those described in the Examples.

In some embodiments, the compound having the formula $[R^1{}_2R^2SiO_{1/2}]_a[R^1R^2SiO_{2/2}]_b[R^1SiO_{3/2}]_c[R^2SiO_{3/2}]_d$ $[SiO_{4/2}]_e$ or the compound of the formula $R^1{}_qR^3{}_{(3-q)}SiO(R^1{}_2SiO_{2/2})_mSiR^3{}_{(3-q)}R^1{}_q$ independently are of the formula $H(CH_3)_2SiO[(CH_3)_2SiO_{2/2}]_nSi(CH_3)_2H$, where n is from 10 to 400, or as defined in alternative embodiments herein. Alternatively, the compounds independently are of the formula $H(CH_3)_2SiOSi(CH_3)_2H$, $H(CH_3)(Ph)SiOSi(CH_3)_2H$, $H(Ph)_2SiOSi(CH_3)_2H$, $H(CH_3)(Ph)SiOSi(CH_3)(Ph)H$, $H(Ph)_2SiOSi(Ph)_2H$, $H(CH_3)_2SiOSi(CH_3)_2OSi(CH_3)_2H$, $H(CH_3)_2SiOSi(Ph)(CH_3)OSi(CH_3)_2H$, $H(CH_3)_2SiOSi(Ph)_2OSi(CH_3)_2H$, $H(CH_3)(Ph)SiOSi(Ph)(CH_3)OSi(Ph)(CH_3)H$, $H(CH_3)(Ph)SiOSi(Ph)_2OSi(Ph)(CH_3)H$ or $H(CH_3)_2SiOSi(Ph)_2OSi(Ph)_2OSi(CH_3)_2H$.

The R-LOB Copolymer may be prepared by any suitable method and from any suitable starting material. In some embodiments the R-LOB Copolymer is prepared from a resin-linear organosiloxane pre-prepolymer ("R-LOB Pre-Prepolymer", e.g., reactant (A) below). The R-LOB Pre-Prepolymer has a lower molecular weight than the R-LOB Copolymer and is reactable with (capable of forming a covalent bond to) another reactant (e.g., reactant (B) below) to give the R-LOB Copolymer. The R-LOB Copolymer made in this way has at least one group derived from the R-LOB Pre-Prepolymer and at least one group derived from the other reactant (e.g., from reactant (B)). Alternatively the R-LOB Copolymer may be or comprise the resin-linear organosiloxane pre-prepolymer described below (e.g., the reactant (A) below). An example is a method comprising contacting (e.g., reacting) reactant (A) with reactant (B) to give the R-LOB Copolymer: (A) a resin linear organosiloxane block pre-prepolymer comprising: 40 to 90 mole percent units of the formula $[R^1{}_2SiO_{2/2}]$, 10 to 60 mole percent units of the formula $[R^2SiO_{3/2}]$, 0.5 to 35 mole percent silanol groups [SiOH]; wherein: each $R^1$ independently is a $(C_1-C_{30})$hydrocarbyl free of aliphatic unsaturation, each $R^2$ independently is a $(C_1-C_{30})$hydrocarbyl free of aliphatic unsaturation; wherein: the units $[R^1{}_2SiO_{2/2}]$ are arranged in linear blocks having an average of from 10 to 400 units $[R^1{}_2SiO_{2/2}]$ per linear block, the units $[R^2SiO_{3/2}]$ are arranged in non-linear blocks having a molecular weight of at least 500 g/mole, at least 30% of the non-linear blocks are crosslinked with each other, each linear block is linked to at least one non-linear block via —Si—O—Si—linkages; and the resin-linear organosiloxane block pre-prepolymer has a weight average molecular weight of at least 20,000 g/mole; with (B) a compound of the formula $R^1R^2{}_2SiX$, wherein each $R^1$ independently is a $(C_1-C_{30})$hydrocarbyl free of aliphatic unsaturation or a $(C_1-C_{30})$hydrocarbyl group comprising at least one aliphatic unsaturated bond, each $R^2$ independently is a $(C_1-C_{30})$hydrocarbyl free of aliphatic unsaturation or a $(C_1-C_{30})$hydrocarbyl group comprising at least one aliphatic unsaturated bond, and X is a hydrolyzable group chosen from —OR, F, Cl, Br, I, —OC(O)R, —N(R)$_2$, or —ON=CR$_2$, wherein R is hydrogen or an $(C_1-C_6)$alkyl group that may be unsubstituted or substituted.

Alternatively, the R-LOB Copolymer may be prepared by a method comprising contacting reactant (A) with reactant (B) to give the R-LOB Copolymer: (A) a linear organosiloxane having the formula: $R^1{}_{3-p}(E)_pSiO(R^1{}_2SiO_{2/2})_nSi(E)_pR^1{}_{3-p}$, wherein each $R^1$ independently is a $(C_1-C_{30})$ hydrocarbyl free of aliphatic unsaturation, n is 10 to 400, E is a hydrolyzable group chosen from —OR, F, Cl, Br, I, —OC(O)R, —N(R)$_2$, or —ON=CR$_2$, wherein R is hydrogen or a $(C_1-C_6)$alkyl group, and each p is, independently, 1, 2 or 3; and (B) an organosiloxane resin comprising unit formula: $[R^1_2R^2SiO_{1/2}]_a[R^1R^2SiO_{2/2}]_b[R^1SiO_{3/2}]_c[R^2SiO_{3/2}]_d[SiO_{4/2}]_e$, wherein each $R^1$ independently is a ($C_1$-$C_{30}$)hydrocarbyl free of aliphatic unsaturation or a ($C_1$-$C_{30}$)hydrocarbyl group comprising at least one aliphatic unsaturated bond; each $R^2$ independently is a ($C_1$-$C_{30}$)hydrocarbyl free of aliphatic unsaturation or a ($C_1$-$C_{30}$)hydrocarbyl group comprising at least one aliphatic unsaturated bond, wherein the organosiloxane resin comprises 0 to 35 mole % silanol groups [SiOH], and the subscripts a, b, c, d, and e represent the mole fraction of each unit present in the organosiloxane resin and have the values as follows: a is 0 to 0.6, b is 0 to 1, c is 0 to 1, d is 0 to 1, e is 0 to 0.6, with the provisos that b+c+d+e>0 and a+b+c+d+e≤1. In some embodiments the (B) organosiloxane resin has additional units other than the units shown above, and therefore a+b+c+d+e<1. In other embodiments the (B) organosiloxane resin has only the units shown above, and therefore a+b+c+d+e=1.

Alternatively, the R-LOB Copolymer may be prepared by a method comprising contacting (reacting) reactant (A) with reactant (B) and reactant (C) to give the R-LOB Copolymer: (A) a linear organosiloxane having the formula: $R^1_{3-p}(E)_pSiO(R^1_2SiO_{2/2})_nSi(E)_pR^1_{3-p}$, wherein each $R^1$ independently is a ($C_1$-$C_{30}$)hydrocarbyl free of aliphatic unsaturation, n is 10 to 400, E is a hydrolyzable group chosen from —OR, F, Cl, Br, I, —OC(O)R, —N(R)$_2$, or —ON=CR$_2$, wherein R is hydrogen or a ($C_1$-$C_6$)alkyl group, and each p is, independently, 1, 2 or 3, and (B) an organosiloxane resin comprising unit formula: $[R^1_2R^2SiO_{1/2}]_a[R^1R^2SiO_{2/2}]_b[R^1SiO_{3/2}]_c[R^2SiO_{3/2}]_d[SiO_{4/2}]_e$, wherein each $R^1$ independently is a ($C_1$-$C_{30}$)hydrocarbyl free of aliphatic unsaturation, each $R^2$ independently is a ($C_1$-$C_{30}$)hydrocarbyl free of aliphatic unsaturation, wherein the organosiloxane resin comprises 0 to 35 mole % silanol groups [SiOH], and the subscripts a, b, c, d, and e represent the mole fraction of each unit present in the organosiloxane resin and have the values as follows: a is about 0 to about 0.6, b is about 0 to about 0.6, c is about 0 to about 1, d is about 0 to about 1, e is about 0 to about 0.6, with the provisos that b+c+d+e>0 and a+b+c+d+e≤1; and (C) a compound of the formula $R^1_qSiX_{4-q}$, wherein each $R^1$ independently is a ($C_1$-$C_{30}$)hydrocarbyl free of aliphatic unsaturation or a ($C_1$-$C_{30}$)hydrocarbyl group comprising at least one aliphatic unsaturated bond, q is 0, 1 or 2, and each X independently is a hydrolyzable group chosen from —OR, F, Cl, Br, I, —OC(O)R, —N(R)$_2$, or —ON=CR$_2$, wherein R is hydrogen or a ($C_1$-$C_6$)alkyl group that may be unsubstituted or substituted. The contacting may be performed in any suitable order. For example, reactants (A) and (B) may be contacted first, followed by contacting the resulting intermediate product with reactant (C). Alternatively, reactants (A) and (C) may be contacted first, followed by contacting the resulting intermediate product with reactant (B). Alternatively, reactants (B) and C) may be contacted first, followed by contacting the resulting intermediate product with reactant (A). Alternatively reactants (A), (B), and (C) may be contacted with each other substantially at the same time. In some embodiments, reactants (A) and (B) are contacted first, followed by contacting the resulting intermediate product with reactant (C). In some embodiments the (B) organosiloxane resin has additional units other than the units shown above, and therefore a+b+c+d+e<1. In other embodiments the (B) organosiloxane resin has only the units shown above, and therefore a+b+c+d+e=1.

Alternatively, the R-LOB Copolymer may be prepared by a method comprising reacting a reactable composition having the foregoing constituent reactants via a hydrosilylation reaction in the presence of a reactant compound having unit formula: $[R^1R^2R^8SiO_{1/2}]_f[R^1R^9SiO_{2/2}]_g[R^1SiO_{3/2}]_h$, wherein each of $R^1$ and $R^2$ independently is a ($C_1$-$C_{30}$) hydrocarbyl free of aliphatic unsaturation, each of $R^8$ and $R^9$ independently is H, a ($C_1$-$C_{30}$)hydrocarbyl free of aliphatic unsaturation or a silane radical of the formula —$[R^{10}R^{11}Si]_p[R^{10}R^{11}SiH]$, wherein each of $R^{10}$ and $R^{11}$ independently is H or a ($C_1$-$C_{30}$)hydrocarbyl free of aliphatic unsaturation, p is an integer from 0 to 10, and f is an integer from 0 to 100, g is an integer from 0 to 50, h is an integer from 0 to 60, and the number of SiH groups in the reactant compound having formula $[R^1R^2R^8SiO_{1/2}]_f[R^1R^9SiO_{2/2}]_g[R^1SiO_{3/2}]_h$ is on average ≥2 per molecule (e.g., ≥4, ≥6, ≥8, ≥10; or from 2 to 10 per molecule). Non-limiting examples of reactant compounds having formula $[R^1R^2R^8SiO_{1/2}]_f[R^1R^9SiO_{2/2}]_g[R^1SiO_{3/2}]_h$ wherein g is 0 include $[R^1R^2R^8SiO_{1/2}]_f[R^1SiO_{3/2}]_h$. Non-limiting examples of reactant compounds having formula $[R^1R^2R^8SiO_{1/2}]_f[R^1R^9SiO_{2/2}]_g[R^1SiO_{3/2}]_h$ wherein h is 0 include $[R^1R^2R^8SiO_{1/2}]_f[R^1R^9SiO_{2/2}]_g$.

In some embodiments, a combination of reactant compounds of the formula $[R^1R^2R^8SiO_{1/2}]_f[R^1R^9SiO_{2/2}]_g$ and $[R^1R^2R^8SiO_{1/2}]_f[R^1SiO_{3/2}]_h$ (e.g., $M^H_2D^{Ph}_2$ and $M^{H_{60T}Ph}_{40}$, respectively) is used as constituents in the reactable compositions of the various methods of making the R-LOB Copolymer. The reactant compounds can be used in the combination in any suitable amount and in any suitable ratio. In some examples, a suitable w/w ratio of the two different reactant compounds of the formula $[R^1R^2R^8SiO_{1/2}]_e[R^1R^9SiO_{2/2}]_f$ and $[R^1R^2R^8SiO_{1/2}]_e[R^1SiO_{3/2}]_g$ is from about 8:1 to about 1:8.

The R-LOB Copolymer that has been made by any one of the foregoing methods, has been so made using a first reaction mechanism that is a hydrosilylation reaction mechanism. The hydrosilylation reaction may be conducted under any suitable conditions known in the art for effecting hydrosilylation reactions.

The reactable compositions for making the R-LOB Copolymer contain as another constituent a metal hydrosilylation catalyst, which is carried through to be (ii) the metal of the degradation-inhibited hydrosilylation-curable composition. The hydrosilylation catalyst may be any suitable metal hydrosilylation catalyst such as platinum, rhodium, iridium, palladium, ruthenium or iron. The metal derived from a hydrosilylation catalyst may be platinum or rhodium. For example, such a Pt catalyst is Speier's catalyst ($H_2PtCl_6$; U.S. Pat. Nos. 2,823,218 and 3,923,705) or Karstedt's catalyst ($Pt[H_2C=CH—Si(CH_3)_2]_2O$; U.S. Pat. Nos. 3,715,334 and 3,814,730). Such a Rh catalyst is $[Rh(cod)_2]BF_4$ wherein cod is 1,5-cyclooctadiene, Wilkinson's catalyst ($Rh(PPh_3)_3Cl$ wherein Ph is phenyl), $Ru(\eta^6\text{-arene})Cl_2]_2$ wherein arene is benzene or para-cymene, wherein para-cymene is 1-methyl-4-(1-methylethyl)benzene, a Grubb's catalyst (e.g., $Ru=CHPh(PPh_3)_2Cl_2$ wherein Ph is phenyl), or $[Cp*Ru(CH_3CN)_3]PF_6$ wherein $Cp*$ is 1,2,3,4,5-pentamethylcyclopentadiene anion. Alternatively platinum catalysts include, but are not limited to, the reaction product of chloroplatinic acid and an organosilicon compound containing terminal aliphatic unsaturation, including the catalysts described U.S. Pat. No. 3,419,593. Alternatively, hydrosilylation catalysts include neutralized complexes of platinum chloride and divinyl tetramethyl disiloxane, as described in U.S. Pat. No. 5,175,325. Also, suitable hydrosilylation catalysts are described in U.S. Pat. Nos. 3,159,601; 3,220,972; 3,296,291; 3,516,946; 3,989,668; 4,784,879; 5,036,117; 5,175,325; and EP 0 347 895 B1.

The amount of the hydrosilylation catalyst used in the reactable composition for making the R-LOB Copolymer may be an amount sufficient to give from >0 to 100 ppm of the metal in the R-LOB Copolymer used in the degradation-inhibited hydrosilylation-curable composition. The hydrosilylation catalyst may be added to the reactable composition in an amount equivalent to as little as 0.001 parts by weight of metal, per one million parts (ppm) of the total reactable composition, e.g., from 0.001 to 500 ppm, alternatively from 1 to 200 ppm, alternatively from 1 to 100 ppm.

The hydrosilylation-reacted polyorganosiloxane prepolymer, including the R-LOB Copolymer, may be prepared as a masterbatch. The masterbatch is useful as a comparative example lacking (free of) the sulfur compound. The masterbatch is also useful in a process for preparing different examples of the degradation-inhibited hydrosilylation-curable composition, the process comprising mixing a quantity of the masterbatch with either different quantities of a same sulfur compound or different ones of the sulfur compounds, and optionally 0, 1, or more additional constituents, to give the different examples of the degradation-inhibited hydrosilylation-curable composition.

In some embodiments the R-LOB Copolymer made by any one of the foregoing methods may be contacted with a reactant compound of the formula $R^5{}_q SiX_{4-q}$, wherein each $R^5$ is independently a $(C_1-C_8)$hydrocarbyl (e.g., $(C_1-C_8)$ alkyl group, or alternatively a phenyl group, or alternatively $R^5$ is methyl, ethyl, or a combination of methyl and ethyl) or a halogen-substituted $(C_1-C_8)$hydrocarbyl; and each X is independently a hydrolyzable group chosen from —OR, F, Cl, Br, I, —OC(O)R, —N(R)$_2$, or —ON=CR$_2$, wherein R is hydrogen or a $(C_1-C_6)$alkyl group that may be unsubstituted or substituted. The compound of the formula $R^5{}_q SiX_{4-q}$ may be an alkyltriacetoxysilane, such as methyltriacetoxysilane, ethyltriacetoxysilane, or a combination of both. Commercially available representative alkyltriacetoxysilanes include ETS-900 (Dow Corning Corp., Midland, Mich., USA), methyl tris(methylethylketoxime)silane (MTO), methyl triacetoxysilane, ethyl triacetoxysilane, tetraacetoxysilane, tetraoximesilane, dimethyl diacetoxysilane, dimethyl dioximesilane, and methyl tris(methylmethylketoxime)silane. In some embodiments, the R-LOB Copolymer made by any one of the foregoing methods may be contacted with the compound of the formula $R^5{}_q SiX_{4-q}$ so as to introduce reactive groups into the R-LOB Copolymer, wherein the introduced reactive groups may cure during curing of the degradation-inhibited hydrosilylation-curable prepolymer by second reaction mechanism, e.g., a moisture cure mechanism, which thus follows the first reaction mechanism that is a hydrosilylation cure mechanism.

In some embodiments a $(C_1-C_{30})$hydrocarbyl group comprising at least one aliphatic unsaturated bond may be introduced into the R-LOB Copolymer made by any one of the foregoing methods by contacting the R-LOB Copolymer made by any one of the foregoing methods with a reactant compound of the formula with a compound of the formula $R^1R^2{}_2 SiX$, wherein each $R^1$ independently is a $(C_1-C_{30})$ hydrocarbyl or a $(C_1-C_{30})$hydrocarbyl group comprising at least one aliphatic unsaturated bond, each $R^2$ independently is a $(C_1-C_{30})$hydrocarbyl or a $(C_1-C_{30})$hydrocarbyl group comprising at least one aliphatic unsaturated bond, and X is a hydrolyzable group chosen from —OR, F, Cl, Br, I, —OC(O)R, —N(R)$_2$, or —ON=CR$_2$, wherein R is hydrogen or a $(C_1-C_6)$alkyl group that may be unsubstituted or substituted. The compound of the formula $R^1R^2{}_2 SiX$ may be a compound of formula (Vi)$R^2{}_2 SiX$, (Vi)$R^2{}_2 SiCl$, (Vi)(CH$_3$)$_2 SiX$, (Vi)(CH$_3$)$_2 SiCl$, (Vi)(Ph)$_2 SiX$, (Vi)(Ph)$_2 SiCl$, (Vi-phenylene)$R^2{}_2 SiX$, or (Vi-phenylene)$R^2{}_2 SiCl$. The amount of the compound of the formula $R^1R^2{}_2 SiX$ may be a quantity sufficient to provide the relatively low amount (0.5 to 5 mol %) of unsaturated aliphatic groups in the R-LOB Copolymer.

In the reactant that is the linear organosiloxane having the formula $R^1{}_{3-p}(E)_p SiO(R^1{}_2 SiO_{2/2})_n Si(E)_p R^1{}_{3-p}$, wherein $R^1$, n, and E are as defined herein, the subscript "n" may be considered as the degree of polymerization (dp) thereof. The n may be an integer from 10 to 400; alternatively from 100 to 400; alternatively from 200 to 300; alternatively from 100 to 150.

Methods of preparing R-LOB Copolymers and the reactant that is the organosiloxane resin comprising the formula $[R^1{}_2 R^2 SiO_{1/2}]_a [R^1 R^2 SiO_{2/2}]_b [R^1 SiO_{3/2}]_c [R^2 SiO_{3/2}]_d [SiO_{4/2}]_e$, wherein $R^1$, $R^2$, a, b, c, d, and e, are as defined herein, are known in the art. E.g., see US 2013/0165602 A1, US 2013/0168727 A1, US 2013/171354 A1, US 2013/0172496 A1, and US 2013/0245187 A1. In some embodiments, they are prepared by hydrolyzing an organosilane having three hydrolyzable groups on the silicon atom, such as a halogen or an alkoxy group in an organic solvent. A representative example for the preparation of a silsesquioxane resin may be found in U.S. Pat. No. 5,075,103. Furthermore, many organosiloxane resins are available commercially and sold either as a solid (flake or powder), or as a solution dissolved in an organic solvent. Suitable, non-limiting, commercially available organosiloxane resins include; Dow Corning® 217 Flake Resin, 233 Flake Resin, 220 Flake Resin, 249 Flake Resin, 255 Flake Resin, and Z-6018 Flake Resin (all of Dow Corning Corporation, Midland Mich., USA).

In general, the foregoing methods of preparing the R-LOB Copolymer are carried out with the reactants dissolved or suspended in a solvent, typically an organic solvent such as any one or more of the organic solvents described herein. The method may produce a solution or suspension of the R-LOB Copolymer in the organic solvent.

A solid form of the R-LOB Copolymer may be prepared by removing some or substantially all the organic solvent from the solution or suspension obtained from the process of making same. The solvent may be removed to an extent that the solid form has less than 100 parts per million (ppm), alternatively less than 20 ppm, alternatively less than 10 ppm organic solvent. The solvent may be removed by any known processing techniques. For example, a film of the R-LOB Copolymer and the solvent is formed, and the solvent is allowed to evaporate from the film to give the solid curable composition comprising the R-LOB Copolymer and free of solvent. The resulting dried solid film may be self-supporting or free-standing. The films may be heated and/or exposed to a partial vacuum to accelerate solvent removal and subsequent formation of the solid curable composition. Alternatively, the solution or suspension of the R-LOB Copolymer may be passed through an extruder to remove solvent and provide the solid composition in the form of a ribbon or pellets. Coating operations against a release film could also be used as in slot die coating, knife over roll, rod, or gravure coating. Also, roll-to-roll coating operations could be used to prepare a solid film. In coating operations, a conveyer oven or other means of heating and evacuating the solution can be used to drive off the solvent and obtain the final solid film.

The hydrosilylation cure speed of the R-LOB Copolymer, expressed in pascals per minute (Pa/min) is the slope of the storage modulus, G', as a function of time, as determined from rheology measuring the increase in G' as a function of temperature. The cure speed may be at least 1 Pa/min, alternatively at least 2 Pa/min, alternatively at least 4 Pa/min, alternatively at least 10 Pa/min, alternatively at least 20 Pa/min at a heating rate of 5° C. per minute.

Although not wishing to be bound by any theory, it is possible that the structural ordering of the D and T units in the R-LOB Copolymer, as described herein, may provide the R-LOB Copolymer, and the cured degradation-inhibited resin-linear organosiloxane block polymer prepared therefrom, with certain unique physical property characteristics when the R-LOB Copolymer is a solid. For example, the structural ordering of the D and T units in the R-LOB Copolymer may provide solid coatings that allow for a high optical transmittance of visible light (e.g., at wavelengths between 350 and 750 nm). The structural ordering may also allow the R-LOB Copolymer to flow and cure upon heating, yet remain stable at room temperature. The solid coatings may also be processed using lamination techniques. These properties are useful to provide coatings for various electronic articles to improve weather resistance and durability, while providing low cost and easy procedures that are energy efficient. Finally, the structural ordering of the D and T units in the R-LOB Copolymer may influence, among other things, the glass transition temperature $T_g$, such that the R-LOB Copolymer has a high $T_g$ phase; the tack such that the R-LOB Copolymer has low tack; the strength of the R-LOB Copolymer, as evidenced by, among other things, the tensile strength; and shelf stability. The sulfur compound is compatible with the structural ordering of D and T units in the R-LOB Copolymer.

In some embodiments, the R-LOB Copolymer is isolated in a solid form, for example by casting films of a solution of the R-LOB Copolymer in an organic solvent (e.g., the organic solvents exemplified earlier, e.g., benzene, toluene, xylene, or combinations thereof) and allowing the organic solvent to evaporate. E.g., the solvent is toluene. Under these conditions, the R-LOB Copolymer can be provided as a solution in an organic solvent containing from about 50 wt % to about 80 wt % solids content, e.g., from about 50 wt % to about 65 wt %, alternatively from about 65 wt % to about 80 wt % solids content. Such solutions may have a kinematic viscosity of from 1,500 centiStoke (cSt) to 10,000 cSt at 25° C., e.g., from 1,500 cSt to 3,000 cSt, alternatively from 3,000 to about 6000 cSt, alternatively from 6000 to 10,000 cSt, all at 25° C.

The R-LOB Copolymer may have a Young's modulus after aging for 50 hours at 225° C. that is not substantially different from the Young's modulus before aging for 50 hours at 225° C. In some embodiments, the ratio of the Young's Modulus after aging for 50 hours at 225° C. to the Young's modulus before aging is from 1 to 3, alternatively from 1 to ≤2.5, alternatively from 1 to ≤2.0, alternatively from 1 to ≤1.5. If the ratio is 1, the Young's modulus before and after aging is the same. The R-LOB Copolymer may have a Young's modulus before aging for 30 or 50 hours at 225° C. of from 70 to 200 megapascals (MPa) before aging, alternatively from 70 to 100 MPa, alternatively from 100 to 150 MPa, alternatively from 150 to 200 MPa. The R-LOB Copolymer may have a Young's modulus after aging for 30 hours at 225° C. that is from 100 to 250 MPa, alternatively from 100 to 150 MPa, alternatively from 150 MPa to 200 MPa, alternatively from 200 to 250 MPa.

Upon drying or forming a solid, the non-linear blocks of the R-LOB Copolymer further aggregate together to form "nano-domains." As used herein, "predominately aggregated" means the majority (e.g., greater than 50%; greater than 60%; greater than 75%, greater than 80%, greater than 90%; from about 75% to about 90%, from about 80% to about 90%, or from about 75% to about 85%) of the non-linear blocks of the R-LOB Copolymer are found in certain regions of the solid composition, described herein as "nano-domains." As used herein, "nano-domains" refers to those phase regions within the solid resin-linear block copolymer that are phase separated therein and possess at least one dimension sized from 1 to 100 nanometers. The nano-domains may vary in shape, providing at least one dimension of the nano-domain is sized from 1 to 100 nanometers. Thus, the nano-domains may be regular or irregularly shaped. The nano-domains may be spherically shaped, tubular shaped, and, in some instances, lamellar shaped.

The solid R-LOB Copolymer may contain a first phase and an incompatible second phase, the first phase containing predominately the D units $[R^1_2SiO_{2/2}]$ as defined herein, the second phase containing predominately the T units $[R^2SiO_{3/2}]$ as defined herein, the non-linear blocks being sufficiently aggregated into nano-domains which are incompatible with the first phase.

The structural ordering of the D and T units in the solid R-LOB Copolymer and characterization of the nano-domains may be determined explicitly using certain analytical techniques such as Transmission Electron Microscopic (TEM) techniques, Atomic Force Microscopy (AFM), Small Angle Neutron Scattering, Small Angle X-Ray Scattering, and Scanning Electron Microscopy. Alternatively, the structural ordering of the D and T units in the R-LOB Copolymer, and formation of nano-domains in the solid R-LOB Copolymer, may be implied by characterizing certain physical properties of a coating prepared from the solid R-LOB Copolymer. For example, the R-LOB Copolymer may provide a coating that has an optical transmittance of visible light greater than 95%. Such optical clarity is possible (other than refractive index matching of the two phases) only when visible light is able to pass through such a medium and not be diffracted by particles (or domains as used herein) having a size greater than 150 nanometers. As the particle size, or domains further decreases, the optical clarity may be further improved. Thus, a coating or encapsulant derived from the solid R-LOB Copolymer may have an optical transmittance of visible light of at least 95%, e.g., at least 96%; at least 97%; at least 98%; at least 99%; or 100% transmittance of visible light at a coating or encapsulant or film thickness of 0.5 mm. As used herein, the term "visible light" includes light with wavelengths between 350 and 750 nm.

The inventive composition may further contain a free organosiloxane resin (e.g., that is not part of (not covalently bonded in) the R-LOB Copolymer or sulfur compound of formula (I)). The free organosiloxane resin also predominately aggregates within the nano-domains. In some embodiments, the free organosiloxane resin is present in the inventive composition in an amount of from 5 to 30 wt %, alternatively from 10 to 30 wt %, all based on total weight of the composition.

At least one of the hydrosilylation-curable polyorganosiloxane prepolymer and the sulfur compound is an organosiloxane containing a T-type unit of formula $[X—SiO_{3/2}]$, wherein X is HS—, $R^2$, $R^3$, —$R^6$—S—, —(S)$_m$—$R^7$—, or —S— as described above.

In the compound of formula (III), at least about 1 mole % of $R^{11}$ and/or $R^{12}$ are H or SiH containing silane radical; alternatively at least about 5 mole %, alternatively at least about 10 mole %, alternatively at least about 15 mole %, alternatively at least about 20 mole %; alternatively from about 1 to about 20 mole %, alternatively from about 1 to about 10 mole %, alternatively from about 1 to about 5 mole %.

The inventive composition, and the cured product made therefrom, lacks or is free of an ingredient that would impair the beneficial effect of the sulfur compound on inhibiting degradation of the composition or product. In some aspects the composition, and the cured product made therefrom, lacks or is free of any one or more of the following ingredients: a peroxide (e.g., an organic peroxide); a metal other than the metal of the hydrosilylation catalyst; and a zero valent phosphorous-containing compound.

In some aspects the composition, and the cured product made therefrom, lacks or is free of a volatile sulfur compound that, due to its volatility, is not an optimal match for remaining in the composition, and the cured product made therefrom, over time or is contraindicated for use in applications wherein volatilized sulfur compound could become a customer acceptance concern (e.g., due to an offensive odor). Dimethyl disulfide has a boiling point of 109° C. and due to its volatility is not a sulfur compound as used herein. Diethyl disulfide has a boiling point of 151-153° C. and typically is not a sulfur compound as used herein except in applications wherein volatilized diethyl disulfide is not a concern.

In some aspects the composition, and the cured product made therefrom, lacks or is free of a filler-grafted sulfur compound, which due to its being covalently bonded (grafted or tethered) to a particulate solid filler, cannot be used without dramatically changing the physical, mechanical, optical, and/or chemical properties of the composition or cured product. Thus, in some aspects the present sulfur compound is not a silica-grafted sulfur compound, alumina-grafted sulfur compound, organic polymer-grafted sulfur compound, or the like.

In some aspects the sulfur compound of the composition, the cured product made therefrom, may be chosen as a sulfide, alternatively a disulfide, alternatively a trisulfide, alternatively a tetrasulfide. Factors influencing a choice may depend on particular circumstances such as cost, commercial availability, stability under conditions of the intended use, and the like. In some aspects the composition is as described herein except wherein subscript m is 0, 1, or 2; alternatively m is 0, 1, or 3; alternatively m is 0, 2, or 3; alternatively m is 1, 2, or 3; alternatively m is 0 or 1; alternatively m is 0 or 2; alternatively m is 0 or 3; alternatively m is 1 or 2; alternatively m is 1 or 3; alternatively m is 2 or 3; alternatively m is 0; alternatively m is 1; alternatively m is 2; alternatively m is 3. A sulfide group, also referred to herein as a monosulfide group, has the characteristic atom sequence, C—S—C. A disulfide group has the characteristic atom sequence, C—S—S—C. A trisulfide group has the characteristic atom sequence, C—S—S—S—C. A tetrasulfide group has the characteristic atom sequence, C—S—S—S—S—C.

In some aspects, the atomic amount, in moles, of the sulfur atoms of the sulfur compound relative to the atomic amount, in moles, of (ii) the metal derived from a hydrosilylation catalyst is at least 5 times, alternatively at least 10 times, alternatively at least 20 times, alternatively at least 50 times, alternatively at least 100 times, alternatively at least 500 times, alternatively at least 1,000 times greater; alternatively any one of the foregoing minimum times greater and a maximum of 10,000 times, alternatively <7,000 times, alternatively <5,000 times, alternatively <3,000 times greater. For example, the atomic amount, in moles, of sulfur atoms of the sulfur compound may be from 50 to 1,500 times greater than the atomic amount, in moles, of the metal derived from a hydrosilylation catalyst.

The amount of the sulfur compound is a quantity sufficient to inhibit thermal degradation or photo-thermal degradation (i.e., a quantity that enhances thermal stability or photo-thermal stability, respectively) of the hydrosilylation-curable polyorganosiloxane prepolymer in the composition, and the cured product made therefrom, by at least 20 percent, as compared to such degradation of a comparative composition, a comparative cured product made therefrom, lacking (being free of) the sulfur compound, when tested at both 23° and 120° C. Based on one million parts by weight of the inventive composition, in some aspects the amount of the sulfur compound is greater than 200 parts per million (ppm), alternatively at least 400 ppm, alternatively at least 450 ppm, alternatively at least 470 ppm, alternatively at least 500 ppm, alternatively at least 700 ppm, alternatively at least 1,000 ppm, alternatively >1,900 ppm, alternatively >2,400 ppm, alternatively >3,000 ppm; alternatively any one of the foregoing minimum amounts and a maximum amount of <20,000 ppm, alternatively <15,000 ppm, alternatively <10,000 ppm, alternatively <5,000 ppm, alternatively <4,000 ppm. For example, the amount of the sulfur compound may be from 450 to 4,000 ppm, alternatively 450 to 1,499 ppm, alternatively from 700 to 4,000 ppm in the composition.

In some aspects the composition, and the cured product made therefrom, is as described herein except with the proviso that the sulfur compound is not any one or more of, alternatively all of the following disulfides: O,O'-dibenzamidodiphenyl disulfide; 2-benzothiazole disulfide; diethyl disulfide; 2,5-dimethyl-2,5-di(tertiary-butylperoxy)hexane disulfide (DBPH); thiuram disulfide; a metal-containing disulfide compound, wherein the metal is germanium, tin, lead, arsenic, antimony, bismuth, selenium, tellurium, polonium, astatine, a lanthanoids, an actinoid, or a metal of any one of Groups 1 to 13 of the Periodic Table of the Elements; a phosphorous-containing disulfide compound; or a silica-containing disulfide compound.

In some aspects the composition, and the cured product made therefrom, excludes one or more of certain sulfur compounds. In some of such aspects the composition, and the cured product made therefrom, is as described herein except with the proviso that the sulfur compound is not any one or more of, alternatively all of: O,O'-dibenzamidodiphenyl disulfide; 2-benzothiazole disulfide; diethyl disulfide; 2,5-dimethyl-2,5-di(tertiary-butylperoxy) hexane disulfide (DBPH); a metal-containing sulfur compound, wherein the metal is germanium, tin, lead, arsenic, antimony, bismuth, selenium, tellurium, polonium, astatine, a lanthanoids, an actinoid, or a metal of any one of Groups 1 to 13 of the Periodic Table of the Elements; a phosphorous-containing sulfur compound; a silica-containing sulfur compound; and a thiocarbonyl-containing compound. An example of a thiocarbonyl-containing compound is a thiuram disulfide. In some of such aspects the excluded sulfur compound includes a thiocarbonyl-containing compound that is a thiuram disulfide, a sulfonic acid, a sulfonic acid ester, a sulfonamide, a sulfoxide, a sulfone, a sulfite, or a sulfate. In some aspects the composition, and the cured product made therefrom, is as described hereabove except it also excludes (i.e., lacks or is free of) a particulate metal filler.

In some aspects the composition, and the cured product made therefrom, is as described herein except with the proviso that the sulfur compound is not diethyl disulfide and not 2-benzothiazole disulfide; and also not any one or more of, alternatively all of: O,O'-dibenzamidodiphenyl disulfide;

2,5-dimethyl-2,5-di(tertiary-butylperoxy)hexane disulfide (DBPH); a metal-containing sulfur compound, wherein the metal is germanium, tin, lead, arsenic, antimony, bismuth, selenium, tellurium, polonium, astatine, a lanthanoids, an actinoid, or a metal of any one of Groups 1 to 13 of the Periodic Table of the Elements; a phosphorous-containing sulfur compound; a silica-containing sulfur compound; and a thiocarbonyl-containing compound.

In such aspects the proviso may be as described in the immediately foregoing paragraphs with an additional proviso that the sulfur compound is not dioctadecyl disulfide, that is not $CH_3(CH_2)_{17}SS(CH_2)_{17}CH_3$. In other aspects the sulfur compound is dioctadecyl disulfide.

In some aspects the sulfur compound is the sulfur-functional organosiloxane of formula (I): $(R^3R^4R^5SiO_{1/2})_{a1}(R^3R^4SiO_{2/2})_{b1}(R^3SiO_{3/2})_{c1}(O_{3/2}Si-R^6-S-(S)_m-R^7-SiO_{3/2})_{d1}(SiO_{4/2})_{e1}$(I), wherein subscripts m, a1, b1, c1, d1, and e1; and $R^3$, $R^4$, $R^5$, $R^6$ and $R^7$ are as defined above.

The sulfur-functional organosiloxane of formula (I) may consist essentially of, alternatively consist of D and T units. Such "DT" embodiments of the sulfur-functional organosiloxane of formula (I) may have from 5 to 10 mol % of Si atoms that are covalently bonded to a bivalent group of formula $-R^6-S-S-R^7-$, wherein each of $R^6$ and $R^7$ independently is an unsubstituted $(C_1-C_6)$hydrocarbylene. Each unsubstituted $(C_1-C_6)$hydrocarbylene independently may be a $(C_1-C_6)$alkylene or phenylene. Each $(C_1-C_6)$ alkylene independently may be methylene ($CH_2$), ethylene ($CH_2CH_2$), propylene, ($CH_2CH_2CH_2$) 1-methylethylene, butylene, 2-methylpropylene, pentylene, or hexylene. Each phenylene independently may be 1,4-phenylene; 1,3-phenylene; or 1,2-phenylene.

In some aspects the composition of any preceding embodiment is substantially solvent free.

Methods of preparing the sulfur-functional organosiloxane of formula (I) may be based on adaptations of the methods of US 2013/0165602 A1, US 2013/0168727 A1, US 2013/171354 A1, US 2013/0172496 A1, and US 2013/0245187 A1. For example, the sulfur functional group(s) is/are introduced via a condensation reaction by co-hydrolyzing an organosiloxane and a sulfur group containing alkoxysilane in the presence of hydrogen chloride. For example, by co-hydrolyzing an alkoxy functional compound of formula $(R^3R^4R^5SiO_{1/2})_{a1}(R^3R^4SiO_{2/2})_{b1}(R^3SiO_{3/2})_{c1}(SiO_{4/2})_{e1})$ wherein at least one $R^3$ is an alkoxy group (e.g., $(C_1-C_6)$alkylO—) with a sulfur group containing alkoxysilane in the presence of hydrogen chloride. The sulfur group containing alkoxysilane may be a compound of formula $(alkoxy)_3-Si-R^6-S-(S)_m-R^7-Si-(alkoxy)_3$, $(alkoxy)_2-SiR^3-R^6-S-(S)_m-R^7-SiR^3(alkoxy)_2$, or alkoxy-Si$(R^3)_2-R^6-S-(S)_m-R^7-Si(R^3)_2$alkoxy when d1>0, and subscripts m, a1, b1, c1, d1, and e1; and $R^3$, $R^4$, $R^6$ and $R^7$ are as defined earlier. Alternatively, the sulfur group containing alkoxysilane may be a compound of formula $R^3R^4R^5Si$-alkoxy, $R^3R^4Si(alkoxy)_2$, or $R^3Si(alkoxy)_3$, wherein at least one of $R^3$, $R^4$, and $R^5$ independently is a mercapto-functional $(C_1-C_{30})$hydrocarbyl or a $(C_1-C_{30})$heterohydrocarbyl containing a sulfide group, a disulfide group, a trisulfide group, or a tetrasulfide group and the remainder of $R^3$, $R^4$, and $R^5$ independently are as defined in formula (I).

The degradation-inhibited hydrosilylation-curable composition may be prepared in wet form by hydrosilylation reacting the reactants used to prepare the R-LOB Copolymer in the presence of the sulfur compound and in an organic solvent. Alternatively, the sulfur compound may be added to the aforementioned solution or suspension of the R-LOB Copolymer in the organic solvent that is obtained from the aforementioned methods of making the R-LOB Copolymer (and is free of a sulfur compound) to give the degradation-inhibited hydrosilylation-curcurable composition in wet form.

A solid form of the degradation-inhibited hydrosilylation-curable composition may be prepared by removing some or substantially all the organic solvent from the wet form thereof. For example, a film of the degradation-inhibited hydrosilylation-curable composition comprising the R-LOB Copolymer, sulfur compound, and the solvent is formed, and the solvent is allowed to evaporate from the film to give the solid form of the degradation-inhibited hydrosilylation-curable composition. The films may be heated and/or exposed to a partial vacuum to accelerate solvent removal and subsequent formation of the solid composition. Alternatively, the wet form of the degradation-inhibited hydrosilylation-curable composition may be passed through an extruder to remove solvent and provide the solid composition in the form of a ribbon or pellets. Coating operations against a release film could also be used as in slot die coating, knife over roll, rod, or gravure coating. Also, roll-to-roll coating operations could be used to prepare a solid film. In coating operations, a conveyer oven or other means of heating and evacuating the solution can be used to drive off the solvent and obtain the final solid film.

Determining numerical property values: for purposes of the present invention and unless indicated otherwise, the numerical property values used herein may be determined by the following procedures.

Determining minimum storage modulus (minimum G') in kilopascals at 150° C.: for purposes of the present invention examples and unless indicated otherwise, use TA Instruments ARES-RDA (2KSTD standard flexural pivot spring transducer) with forced convection oven to measure the storage modulus (G') as a function of time (isothermal at 150° C.). Typical conditions: 1 Hz frequency, 5% strain, use 25 mm parallel plates and a sample with thickness around 1 mm.

Determining the Young's modulus: for purposes of the present invention examples and unless indicated otherwise, use an Instron universal test machine utilizing Bluehill 2 software, and with 2 inch/min test speed at ambient temperature and humidity.

Determining the elongation-at-break: for purposes of the present invention examples and unless indicated otherwise, use an Instron universal test machine utilizing Bluehill 2 software, and with 2 inch/minute (5.08 cm/minute) test speed at ambient temperature and humidity.

Determining the thermal aging method: for purposes of the present invention examples and unless indicated otherwise, use an Thermo Scientific oven with ventilation at 225° C. for certain time (48, 72, 240 or 500 hours). Thermal aging is done on a dried solid form of the inventive composition or a hydrosilylation cured product made therefrom.

Determining the cure speed: for purposes of the present invention examples and unless indicated otherwise, use oscillatory shear melt rheology measurement and the cure speed (hydrosilylation cure speed) is the time to tan delta (Tan δ)=1.

Determining the fragility and/or embrittlement: for purposes of the present invention examples and unless indicated otherwise, use an Instron universal test machine utilizing Bluehill 2 software, and with 2 inch/minute (5.08 cm/minute) test speed at ambient temperature and humidity.

Determining the Time required for Tan δ=1 @ 150° C. (minutes): for purposes of the present invention examples and unless indicated otherwise, use oscillatory shear melt rheology measurement and the cure speed (hydrosilylation cure speed) is the time to tan delta (Tan δ)=1.

Determining the CIE b* color value (i.e., the CIE 1931 RGB color space value b* created by the International Commission on Illumination (CIE) in 1931): for purposes of the present invention examples and unless indicated otherwise, use BYK colorimeter to measure the CIE b* values of 2×4 cm samples (1 mm thickness) before and after aging for 72 hours at 225° C. Alternatively, CIE b* color values may be obtained using a color measurement tool such as a Konica-Minolta CM-5 spectrophotometer.

Sulfur Compound 1: dihexyl disulfide (i.e., $CH_3(CH_2)_5SS(CH_2)_5CH_3$).

Sulfur Compound 2: dioctadecyl disulfide (i.e., $CH_3(CH_2)_{17}SS(CH_2)_{17}CH_3$).

Sulfur Compound 3: the sulfur-functional organosiloxane of formula $(T^{C_3H_6S-})_{0.090}T^{Ph}_{0.910}$, as described above.

Sulfur Compound 4: dioctadecyl trisulfide (i.e., $CH_3(CH_2)_{17}SSS(CH_2)_{17}CH_3$).

Sulfur Compound 5: dioctadecyl tetrasulfide (i.e., $CH_3(CH_2)_{17}SSSS(CH_2)_{17}CH_3$).

Sulfur Compound 6: bis(2-butoxy-ethyl) disulfide (i.e., $CH_3(CH_2)_3OCH_2CH_2SS(CH_2)_2O(CH_2)_3CH_3$).

Sulfur Compound 7: 1-docosanethiol (i.e., $CH_3(CH_2)_{21}SH$).

Preparation 1 (Prep. 1): synthesis of an MTA/ETA capped silanol-terminated poly(methyl,phenyl)siloxane (a hydroxyl-terminated poly(methyl,phenyl)siloxane wherein the hydroxyls have been capped by condensation with methyltriacetoxysilane/ethyltriacetoxysilane (MTA/ETA): added 50/50 wt % methyltriacetoxysilane/ethyltriacetoxysilane (MTA/ETA) (4.24 g, 0.0187 moles Si) to a hydroxyl-terminated poly(methyl,phenyl)siloxane (220 g, 1.614 moles Si, DP=181; wherein "DP" stands for degree of polymerization as determined from $^{29}$Si-NMR) and stirred the resulting mixture at room temperature in a glove box for 1 hour to give the MTA/ETA capped silanol-terminated poly(methyl,phenyl)siloxane.

Prep. 2a: R-LOB Copolymer 1 a representative preparation of a $D^{Vi}$-functional hydrosilylation-curable resin-linear organosiloxane block copolymer with 2 mol % vinyl groups: Charged a 500 mL 4-neck round bottom flask with phenyl-T resin (180 g, 1.318 moles Si, Dow Corning 217 Flake) and toluene (138.6 g) under nitrogen gas. Equipped the flask with a thermometer, poly(tetrafluoroethylene) stir paddle, and a Dean Stark Apparatus (DSA) attached to a water-cooled condenser. The DSA was prefilled with toluene. Heated the mixture at reflux for 30 minutes and removed 0.54 g water. Cooled the reaction solution to 108° C., and then quickly added the MTA/ETA capped silanol terminated Ph,Me siloxane. Heated the reaction mixture at reflux for 2 hours under nitrogen and removed 2.01 g water. Cooled the reaction solution to 108° C., and charged flask with VMDA (vinylmethyldiacetoxysilane, 11.91 g, 0.0633 moles Si). Then heated the mixture at reflux for 1 hour and removed 1.05 g water. Then cooled the reaction mixture to 90° C., and added DI water (47.8 g). Heated the mixture at reflux to remove water via azeotropic distillation. Cooled the reaction solution to 108° C., and added 50/50 MTA/ETA (21.57 g, 0.0949 moles Si). Heated the mixture at reflux for 1 hour, and then cooled the reaction mixture to 90° C. and added DI water (47.8 g). Heated the mixture at reflux to remove water via azeotropic distillation. Repeated this adding 47.8 g DI water, heating to remove water sequence two more times to give a solution. Then increased the solid content of the solution to about 70 wt % by distilling and removing some volatiles (103.6 g) at 118° C. to give a clear and colorless solution of the $D^{Vi}$-functional R-LOB Copolymer in toluene. The $D^{Vi}$-functional R-LOB Copolymer contained 2 mol % vinyl (Vi), a SiOH content of 17 mol %, a total D unit content of 55 mol %, and a total T-unit content of 45 mol %. Stored the solution for future use.

Prep. P2b (prophetic): a substantially solvent-free hydrosilylation-curable resin-linear organosiloxane block copolymer: add an aliquot of the toluene solution of synthesized hydrosilylation-curable resin-linear organosiloxane block copolymer of Prep. 2a to a round-bottom flask and using a rotary evaporator under vacuum evaporate the toluene to give the substantially solvent-free hydrosilylation-curable resin-linear organosiloxane block copolymer.

Prep. 3: preparation of a masterbatch of an example of a hydrosilylation-curable polyorganosiloxane prepolymer having 2.5 ppm Pt: Mixed together the following constituents (a) to (c): (a) a toluene solution of an R-LOB Copolymer 1 having a vinyl content of 2 mol %, a SiOH content of 17 mol %, a total D unit content of 55 mol %, and a total T-unit content of 45 mol %, wherein the D units consisted essentially of $D^{Ph}$ (i.e., $[(CH_3)(Ph)SiO_{2/2}])$ and $D^{Vi}$ (i.e., $[(H_2C=CH)(CH_3)SiO_{2/2}]$) units and the T-units consisted essentially of $[PhSiO_{3/2}]$ units; (b) a MT resin of formula $M^H_{0.6}T^{Ph}_{0.4}$; and (c) an effective amount of a platinum hydrosilylation catalyst to give the masterbatch having 999, 997.5 ppm of constituents (a), (b), and all but the metal of constituent (c) and 2.5 ppm of Pt.

Prep. 4: preparation of a masterbatch of an example of a hydrosilylation-curable polyorganosiloxane prepolymer having 1 ppm Pt: replicated the procedure of Prep. 3 except used 0.40 times the effective amount of the platinum hydrosilylation catalyst to give the masterbatch having 999, 999 ppm of constituents (a), (b), and all but the metal of constituent (c) and 1 ppm of Pt.

Comparative Example(s) (CE) used herein is/are non-invention example(s) that may help illustrate some benefits or advantages of the invention when compared to invention examples, which follow later. Comparative Examples should not be deemed to be prior art.

Comparative Example (CE) 1

Prepared a Quantity of the Masterbatch of Prep. 3 as CE 1.

The invention is further illustrated by, and an inventive embodiment may include any combinations of features and limitations of, the non-limiting examples thereof that follow. The concentrations of ingredients in the compositions/formulations of the examples are determined from the weights of ingredients added unless noted otherwise.

Inventive Example (IEx.) 1

Preparation of an example of the sulfur-functional organosiloxane of formula (I), wherein the example has the formula $(T^{C_3H_6S-})_{0.090}T^{Ph}_{0.910}$, wherein pairs of the $(T^{C_3H_6S-})$ units are bonded together via their sulfur atoms to comprise a divalent dimeric unit of formula $(T^{C_3H_6S-SC_3H_6T})$. Starting with a phenyl-T Resin (lot #-7796412, Dow Corning 217 Flake, contained a small residue of 2-propanol) of formula of the formula $[PhSiO_{3/2}]$ formula weight (FW) 136.6 g/mol normalized to moles of Si; bis-(triethoxysilylpropyl) disulfide) of formula $((CH_3CH_2O)_3SiCH_2CH_2CH_2S)_2$, FW=237.4 g/mol normalized to moles of Si; toluene (Fisher Scientific ACS grade); concentrated HCl; and deionized (DI) water. Charged a 1 liter (L), 3-neck round bottom flask with the Phenyl-T Resin (220.0 g, 1.611 mol Si) and toluene (220.00 g) to give a 50 wt % resin solution in toluene. Then equipped the flask with a thermometer, poly(tetrafluoroethylene) stir paddle, and a water-cooled condenser. To the equipped flask added bis-(triethoxysilylpropyl)disulfane (42.20 g, 0.1778 mol Si) at room temperature with mixing, then added conc. HCl (0.652 g) at room temperature with mixing. The resulting mixture contained 500 parts per million (ppm) of hydrogen chloride (HCl) equivalents. Heated the mixture at reflux for 4 hours, during which period the reflux temperature fell from 100° C. to 85° C. Then cooled the mixture to 65° C., added DI water (9.61 g), and heated at reflux (81° C.) for 1 hour. Then added toluene (110.0 g) to decrease the nonvolatile content down to about 40 wt % for water washing and conversely increase the volatile content up to about 60 wt %. Washed the reduced volume mixture at 80° C. with water three times to remove residual HCl. Water wash #1 was 72.0 g of DI water, the molar amount of water equivalent to the theoretical molar amount of ethanol that could have been produced (24.0 g). Water washes #2 and #3 were 55 g each; the amount equivalent to about 10 wt % of the resin solution in toluene. The potential of hydrogen (pH) of the final wash #3 water was about pH 4. Then heated the resulting resin solution in toluene to reflux, and removed residual water by azeotropic distillation. Stripped the resin solution in toluene on a rotary evaporator using a 3 L, 1-neck round bottom flask in an oil bath at 150° C., under an about 1 mm Hg vacuum (133 pascals) to give a viscous resin/foam. Removed the flask from the oil bath, and cooled it to room temperature under vacuum to give a foamed material. Mechanically broke up the foam, and then applied vacuum again to give a loose material, which was removed from the flask (about 50 wt % to 60 wt % removed). With the material remaining in the flask, re-applied vacuum, then heated the flask back up to 150° C. to give more foamed material. Recovered the foamed material as before to give a total yield of 237 g of a clear, colorless crunchy solid. As determined by $^{29}$Si-NMR (d$_6$-benzene) and $^{13}$C-NMR (d-chloroform), the solid is an R-LOB Copolymer of formula $(T^{C_3H_6S-})_{0.090}T^{Ph}_{0.910}$, and having 41.2 mol % OZ, of which 31.3 mol % is OH, 9.0 mol % is OEt, and 0.9 mol % is OiPr, which OiPr was carried through from the Phenyl-T Resin-217 Flake. The Si mole ratios were determined as the theoretical values. $^{29}$Si-NMR (d$_6$-benzene): −50 to −60 ppm (one peak for M(OZ)$_2$ and D(OZ), 5.6 mol %), −62 to −70 ppm and −70 to −84 ppm (two peaks for T units, 94.4 mol %); $^{13}$C-NMR (d-chloroform): 125-140 ppm (multi-peaks), 60 ppm (single), 43 ppm (single), 26 ppm (single), 24 ppm (single), 22 ppm (single), 19 ppm (single), 12 ppm (single).

IEx. 2a to 2e

Preparation of degradation-inhibited hydrosilylation-curable compositions containing, inter alia, 2.5 ppm Pt and 1,000 ppm Sulfur Compound 1, 2,000 ppm Sulfur Compound 1, 2,500 ppm Sulfur Compound 1, 3,000 ppm Sulfur Compound 1, and 3,500 ppm Sulfur Compound 1, respectively: mixed different predetermined quantities of 1,000 parts, 2,000 parts, 2,500 parts, 3,000 parts, and 3,500 parts Sulfur Compound 1 (dihexyl disulfide) into separate samples of 999,000 parts, 998,000 parts, 997,500 parts, 997,000 parts, and 996,500 parts, respectively, of the masterbatch of Prep. 3 to give the degradation-inhibited hydrosilylation-curable compositions of IEx. 2a (2.5 ppm Pt and 1,000 ppm Sulfur Compound 1), IEx. 2b (2.5 ppm Pt and 2,000 ppm Sulfur Compound 1), IEx. 2c (2.5 ppm Pt and 2,500 ppm Sulfur Compound 1), IEx. 2d (2.5 ppm Pt and 3,000 ppm Sulfur Compound 1), and IEx. 2b (2.5 ppm Pt and 3,500 ppm Sulfur Compound 1).

IEx. 3

Preparation of degradation-inhibited hydrosilylation-curable composition containing, inter alia, 1 ppm Pt and 2,500 ppm Sulfur Compound 1. Replicated the procedure of IEx. 2c except replaced the masterbatch of Prep. 3 with the masterbatch of Prep. 4 to give the degradation-inhibited hydrosilylation-curable composition of IEx. 3 (1 ppm Pt and 2,500 ppm Sulfur Compound 1).

IEx. 4

Preparation of degradation-inhibited hydrosilylation-curable composition containing, inter alia, 2.5 ppm Pt and 1,000 ppm Sulfur Compound 2 (dioctadecyl disulfide). Replicated the procedure of IEx. 2a except replaced the Sulfur Compound 1 with the Sulfur Compound 2 to give the degradation-inhibited hydrosilylation-curable composition of IEx. 4 (2.5 ppm Pt and 1,000 ppm Sulfur Compound 2).

IEx. 5

Preparation of degradation-inhibited hydrosilylation-curable composition containing, inter alia, 2.5 ppm Pt and 780 ppm Sulfur Compound 1. Replicated the procedure of IEx. 2a except used 780 parts of the Sulfur Compound 1 and 999,220 parts of the masterbatch of Prep. 3 to give the degradation-inhibited hydrosilylation-curable composition of IEx. 5 (2.5 ppm Pt and 780 ppm Sulfur Compound 1).

IEx. 6

Preparation of degradation-inhibited hydrosilylation-curable composition containing, inter alia, a platinum catalyst providing a concentration of 1 ppm Pt and containing a concentration of 500 ppm of Sulfur Compound 2. Replicated the procedure of IEx. 2a except changed the amount of the Pt catalyst used so as to change the concentration of Pt metal from 2.5 ppm Pt to 1 ppm Pt; and replaced the 1,000 ppm of Sulfur Compound 1 with 500 ppm of the Sulfur Compound 2 (dioctadecyl disulfide) to give the degradation-inhibited hydrosilylation-curable composition of IEx. 6.

IEx. 7

Preparation of degradation-inhibited hydrosilylation-curable composition containing, inter alia, a platinum catalyst providing a concentration of 1 ppm Pt and containing a concentration of 500 ppm of Sulfur Compound 6. Replicated the procedure of IEx. 2a except changed the amount of the Pt catalyst used so as to change the concentration of Pt metal from 2.5 ppm Pt to 1 ppm Pt; and replaced the 1,000 ppm of Sulfur Compound 1 with 500 ppm of the Sulfur Compound 6 to give the degradation-inhibited hydrosilylation-curable composition of IEx. 7 (1 ppm Pt and 500 ppm Sulfur Compound 6).

IEx 8

Preparation of degradation-inhibited hydrosilylation-curable composition containing, inter alia, a platinum catalyst providing a concentration of 1 ppm Pt and containing a concentration of 500 ppm of Sulfur Compound 7 (1-docosanethiol). Replicated the procedure of IEx. 2a except changed the amount of the Pt catalyst used so as to change the concentration of Pt metal from 2.5 ppm Pt to 1 ppm Pt; and replaced the 1,000 ppm of Sulfur Compound 1 with 500 ppm of the Sulfur Compound 7 to give the degradation-inhibited hydrosilylation-curable composition of IEx. 8 (1 ppm Pt and 500 ppm Sulfur Compound 7).

IEx. a1 to a4 and b1

Thermally aged products. Thermally aged (i.e., subjected to thermal aging) the degradation-inhibited hydrosilylation-curable compositions of IEx. 2a to 2d and IEx. 3 at 150° C. for 5.2 minutes, 7.1 minutes, 8.6 minutes, 9.6 minutes, and 12 minutes, respectively, to give thermally aged products of IEx. a1 to a4 and b1, respectively.

IEx. c1 to c3, d1, and e1

Thermally aged products. Thermally aged the degradation-inhibited hydrosilylation-curable compositions of IEx. 2a to 2c, IEx. 3, and IEx. 4 at 225° C. for 48 hours to give thermally aged products of IEx. c1 to c3, d1, and e1, respectively.

IEx. f1 and f2 and g1

Thermally aged products. Thermally aged the degradation-inhibited hydrosilylation-curable compositions of IEx. 2a and 2b and IEx. 4 at 225° C. for 96 hours to give thermally aged products of IEx. f1, f2, and g1, respectively.

As summarized in Tables 1 and 2 below and illustrated FIGS. 1 and 2, several examples exhibit the improvements of increased thermal stability, decreased embrittlement, decreased discoloration, and controllable hydrosilylation cure speed relative to these properties of a comparative example. Thermal stability and embrittlement are illustrated independently as being inversely proportional to a change in storage modulus (G') or Young's modulus before and after thermal aging, alternatively with or without (comparative example) the sulfur compound. Extent of discoloration is proportional to a change in CIE b* color value before and after thermal aging, alternatively with or without (comparative example) the sulfur compound. The improvements result from the presence sulfur compound in the inventive composition, and the cured product made therefrom.

TABLE 1 storage modulus, loss tangent, and time consumed for loss tangent from 150° C. isothermal rheology curves.

| Ex. No. | [Pt] (ppm) | Sulfur Cpd. No. # (ppm) | G' min. (KPa @ 150° C.) | Tanδ max @ 150° C. | Time required for Tanδ = 1 @ 150° C. (minutes) |
|---|---|---|---|---|---|
| CE 1* | 2.5 | None | 7.46 | 1.28 | 0.6 (total, <150° C.) |
| IEx. 2a | 2.5 | #1 (1,000) | 1.18 | 2.13 | 5.2 (total, <150° C.) |
| IEx. 2b | 2.5 | #1 (2,000) | 0.62 | 2.49 | 7.1 (total) 1 minute (@ 150° C.) |
| IEx. 2c | 2.5 | #1 (2,500) | 0.45 | 2.77 | 8.6 (total) 2.5 minutes (@ 150° C.) |
| IEx. 2d | 2.5 | #1 (3,000) | 0.38 | 2.87 | 9.6 (total) 3.5 minutes (@ 150° C.) |
| IEx. 3 | 1 | #1 (2,500) | 0.25 | 3.31 | 12 (total) 6 minutes (@ 150° C.) |

*comparative; G' min. (KPa @ 150° C.) is minimum storage modulus in kilopascals at 150° C.;
Tanδ max @ 150° C. is expressed as maximum loss tangent at 150° C.;
tan delta is G"/G', wherein G' is storage modulus and G" is loss modulus.

In Table 1, the time (total) stands for the time consumed from the start of rheology to Tan δ=1, but the time (at 150° C.) means the time consumed from the point of temperature just reaching 150° C. to Tan δ=1. The 150° C. isothermal rheology test was used to monitor the cure process of the degradation-inhibited hydrosilylation-curable compositions of IEx. 2a to 2d and IEx. 3 with different loadings of Sulfur Compound 1. The time consumed for Tan δ reducing to 1 at 150° C. indicates the hydrosilylation cure speed of the inventive compositions. The longer the time for Tan δ=1 at 150° C., the slower their cure speeds and the shorter the time for Tan δ=1 at 150° C., the faster their cure speeds. The data in Table 1 indicate that the loading of Sulfur Compound 1 can greatly inhibit Pt catalyzed hydrosilylation cure of the degradation-inhibited hydrosilylation-curable compositions of IEx. 2a to 2d and IEx. 3, and the higher the loading of the Sulfur Compound, the slower their cure speed becomes. In some embodiments the time consumed for Tan δ reducing to 1 at 150° C. for the degradation-inhibited hydrosilylation-curable composition is from 2 to 30 minutes, alternatively from 3 to 20 minutes, alternatively from 4 to 15 minutes, alternatively from 5 to 13 minutes.

TABLE 2 mechanical property changes before and after thermal aging at 225° C. for 48 hours.

| Ex. No. | [Pt] (ppm) | Sulfur Cpd. No. # (ppm) | $R_{\Delta YM}$/MPa/h 48 h or 72 h aging @ 225° C. | Elongation % 0 h @ 225° C. | Elongation % 48 h or 72 h @ 225° C. |
|---|---|---|---|---|---|
| CE 1* | 2.5 | None | 0.56 | 177 | 19 |
| IEx. 2a | 2.5 | #1 (1,000) | 0.09 | 197 | 42.3 |
| IEx. 2b | 2.5 | #1 (2,000) | −0.09 | 198 | 66.9 |
| IEx. 2c | 2.5 | #1 (2,500) | −0.01 | 236 | 71.1 |
| IEx. 3 | 1 | #1 (2,500) | 0.04 | 248 | 76.6 |
| IEx. 4 | 2.5 | #2 (1,000) | 0.02 | 206 | 65.9 |
| IEx. 6 | 1 | #2 (500) | 0.02 (72 h aging) | 197 | 62.8 (72 h aging) |
| IEx. 7 | 1 | #6 (500) | 0.04 (72 h aging) | 195 | 49.2 (72 h aging) |
| IEx. 8 | 1 | #7 (500) | 0.09 (72 h aging) | 283 | 68.7 (72 h aging) |

*comparative; $R_{\Delta YM}$/MPa/h 48 h or 72 h aging @ 225° C. is change in Young's modulus per megapascal per hour after 48 hours or after 72 hours, respectively, thermal aging at 225° C.;
Elongation % 0 h @ 225° C. is elongation-at-break in percent before thermal aging (i.e., at 0 hour);
Elongation % 48 h or 72 h @ 225° C. is elongation-at-break in percent after thermal aging for 48 hours or after 72 hours, respectively, at 225° C.

The data in Table 2 show the enhanced thermal stability of the degradation-inhibited hydrosilylation-curable compositions of IEx. 2a to 2c, IEx. 3 and IEx. 4, and IEx. 6 to IEx. 8 with different loadings of Sulfur Compound 1 and with Sulfur Compound 2 instead of Sulfur Compound 1, or with Sulfur Compound 6 or 7 instead of Sulfur Compound 1. Typically the Young's modulus of the R-LOB Copolymer increases with the increase of thermal aging time. The $R_{\Delta YM}$ data indicate the thermal stability of the compositions has increased relative to that of the comparative example CE 1, which lacked a sulfur compound. The smaller the $R_{\Delta YM}$ value, the higher their thermal stability and the larger the $R_{\Delta YM}$ value, the lower their thermal stability. Compared with the $R_{\Delta YM}$ value of the comparative example CE 1, the inventive compositions, and the cured product made therefrom, which contained different loadings of Sulfur Compound 1 or a different Sulfur Compound 2, show greatly improved thermal stability. The higher Elongation % value, the lesser the fragility of the composition, and the cured product made therefrom; and the lower the Elongation % value, the greater the fragility of the composition, and the cured product made therefrom. The addition of Sulfur Compound 1, 2, 6 or 7 also decreases embrittlement of the inventive compositions, and the cured product made therefrom, especially the products after thermal aging. After thermal aging, the Elongation % of the comparative example CE 1 is less than 20%, but the Elongation % of the thermally aged inventive products remain great than 40%, e.g., from 42% to 77%. Further, the brittleness of the thermally aged samples was easily felt by simply folding the samples. It was very obvious that the comparative example CE 1 broke upon being folded, but the inventive examples were much flexible and did not break upon being folded.

Measured absorbance (optical density or OD) of test samples of CE 1 and IEx. 4 before and after subjecting them to photo-thermal aging in air at 150° C. and 2.25 W/cm² for 0 week (Time 0, i.e., before aging) and after 2 weeks. The photo condition used in these experiments was practical for measurement.

TABLE 3 changes in Absorbance (OD = Optical Density) before and after photo-thermal aging at 150° C. and 2.25 W/cm² for 0 (i.e., before) and 2 weeks (i.e., after).

| Ex. No. | Changes in Absorbance at wavelengths 350, 450, 550, 650 750 nm | | | | | Red shift of UV edge (at OD = 1) |
|---|---|---|---|---|---|---|
| | 350 nm | 450 nm | 550 nm | 650 nm | 750 nm | |
| CE 1* | 0.098 | 0.013 | 0.010 | 0.006 | 0.003 | 11 |
| IEx. 4 | 0.082 | <0.002 | <0.002 | <0.002 | <0.001 | 9 |

*comparative;
IEx. 4 has 1,000 ppm of Sulfur Compound #2.

The data in Table 3 show, even under relatively mild photo-thermal conditions, the photo-thermal stability of the degradation-inhibited hydrosilylation-curable composition of IEx. 4 with Sulfur Compound 2 is enhanced compared to that of CE 1 lacking a sulfur compound.

FIG. 1 shows modulus stability after thermal aging (at 225° C.) examples of the degradation-inhibited hydrosilylation-curable composition of IEx. 4 (▲ line), IEx. 2a (◇ line), and IEx. 2b (lower ● line) and of a comparative example of CE 1 (upper ● line). In FIG. 1, thermal stability is inversely proportional to a change in Young's modulus. The Young's modulus increased with longer thermal aging times, which were 0 hour (i.e., no thermal aging), 48 hours, and 96 hours.

Figure 2:
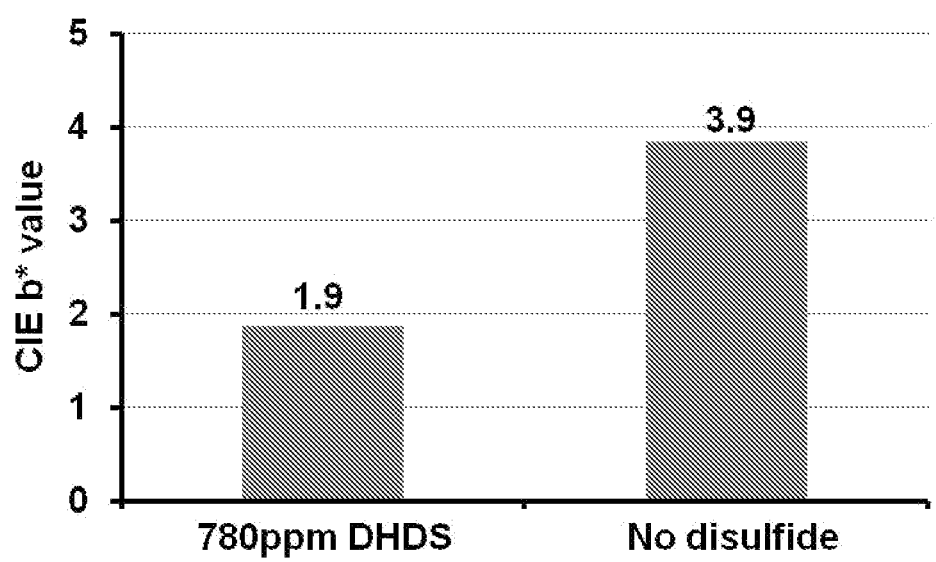
FIG. 2 shows discoloration due to and after thermal aging of an example of the degradation-inhibited hydrosilylation-curable composition and a comparative example, wherein extent of discoloration is proportional to a change in CIE b* color value.

FIG. 2 shows color stability after thermal aging at 225° C. for 72 hours of an example of the degradation-inhibited hydrosilylation-curable composition of IEx. 5 and the comparative example CE 1, wherein color stability is inversely proportional to a change in CIE b* color value. The much lower CIE b* color value of 1.9 for the thermally aged product of IEx. 5 compared to the CIE b* color value of 3.0 for the thermally aged product of CE 1 indicates less yellow color of the inventive product and more yellow color of the comparative product after thermal aging.

The below claims are incorporated by reference here, and the terms "claim" and "claims" are replaced by the term "aspect" or "aspects," respectively. Embodiments of the invention also include these resulting numbered aspects 1 to 20.

What is claimed is:

1. A degradation-inhibited hydrosilylation-curable composition comprising the following constituents:
   (i) a hydrosilylation-curable polyorganosiloxane prepolymer,
   (ii) a metal component of a hydrosilylation catalyst, and
   (iii) a sulfur compound having a boiling point greater than 150 degrees Celsius (° C.);
   wherein the atomic amount, in moles, of sulfur atoms of the sulfur compound is from 5 to 10,000 times greater than the atomic amount, in moles, of (ii) the metal component of a hydrosilylation catalyst; and
   wherein the composition either has the hydrosilylation-curable polyorganosiloxane prepolymer, as described below, for constituent (i-a) or the composition has the sulfur compound, as described below, for constituent (iii-a) or the composition has both constituents (i-a) and (iii-a):
   (i-a) the hydrosilylation-curable polyorganosiloxane prepolymer is a hydrosilylation-curable resin-linear organosiloxane block copolymer comprising:
   40 to 90 mole percent D-type units of the formula $[R^1_2SiO_{2/2}]$,
   10 to 60 mole percent T-type units of the formula $[R^2SiO_{3/2}]$,
   0.5 to 35 mole percent silanol groups [Si—OH];
   wherein each $R^1$ and $R^2$ independently is a $(C_1-C_{30})$hydrocarbyl that has 0 aliphatic unsaturated bond or a $(C_1-C_{30})$hydrocarbyl which comprises at least 1 aliphatic unsaturated bond, wherein the hydrosilylation-curable resin-linear organosiloxane block copolymer comprises from 0.5 to 5 mole percent of the $(C_1-C_{30})$hydrocarbyl comprising at least one aliphatic unsaturated bond;
   wherein the D-type units $[R^1_2SiO_{2/2}]$ are arranged in linear blocks having an average of from 100 to 300 D-type units $[R^1_2SiO_{2/2}]$ per linear block and the T-type units $[R^2SiO_{3/2}]$ are arranged in non-linear blocks having a molecular weight of at least 500 grams per mole (g/mol), wherein at least 30 mole percent of the non-linear blocks are crosslinked with each other and wherein each linear block is linked to at least one non-linear block via a divalent linker comprising a D-type or T-type siloxane unit; and
   wherein the hydrosilylation-curable resin-linear organosiloxane block copolymer has a weight average molecular weight (Mw) of at least 20,000 g/mol; or
   (iii-a) the sulfur compound is a sulfur-functional organosiloxane of formula (I): $(R^3R^4R^5SiO_{1/2})_{a1}$ $(R^3R^4SiO_{2/2})_{b1}(R^3SiO_{3/2})_{c1}(O_{3/2}Si$—$R^6$—$S$—$(S)_m$—$R^7$—$SiO_{3/2})_{d1}(SiO_{4/2})_{e1}$ (I), wherein subscript m is 0, 1, 2, or 3; subscripts a1+b1+c1+d1+e1=1, a1 is from 0 to 0.5, b1 is from 0 to <1, c1 is from 0 to 1, d1 is from 0 to 1, and e1 is from 0 to 0.2;
   wherein each of $R^3$, $R^4$, and $R^5$ independently is a $(C_1-C_{30})$hydrocarbyl, a mercapto-functional ((HS)-functional) $(C_1-C_{30})$hydrocarbyl, or a $(C_1-C_{30})$heterohydrocarbyl containing a sulfide group, a disulfide group, a trisulfide group, or a tetrasulfide group; and
   wherein each of $R^6$ and $R^7$ independently is a bond, a $(C_1-C_{30})$hydrocarbylene, or a $(C_1-C_{30})$heterohydrocarbylene containing a sulfide group, a disulfide group, a trisulfide group, or a tetrasulfide group;
   with the proviso that d1 is >0 or at least one of $R^3$, $R^4$, and $R^5$ independently is a mercapto-functional $(C_1-C_{30})$hydrocarbyl or a $(C_1-C_{30})$heterohydrocarbyl containing a sulfide group, a disulfide group, a trisulfide group, or a tetrasulfide group.

2. The composition of claim 1 wherein the composition has the hydrosilylation-curable polyorganosiloxane prepolymer described as constituent (i-a); wherein the hydrosilylation-curable resin-linear organosiloxane block copolymer comprises 1 to 35 mole percent silanol groups; or the hydrosilylation-curable resin-linear organosiloxane block copolymer comprises 12 to 22 mole percent silanol groups; or the hydrosilylation-curable resin-linear organosiloxane block copolymer has a $M_w$ of 40,000 g/mol to 250,000 g/mol; or the hydrosilylation-curable resin-linear organosiloxane block copolymer comprises 30 to 60 mole percent T-type units of the formula $[R^2SiO_{3/2}]$; or the hydrosilylation-curable resin-linear organosiloxane block copolymer comprises from 0.5 to 4.5 mole percent of the $(C_1-C_{30})$hydrocarbyl comprising at least one aliphatic unsaturated bond; or the hydrosilylation-curable resin-linear organosiloxane block copolymer comprises 12 to 22 mole percent silanol groups; the hydrosilylation-curable resin-linear organosiloxane block copolymer has a Mw of 40,000 g/mol to 250,000 g/mol; the hydrosilylation-curable resin-linear organosiloxane block copolymer comprises 30 to 60 mole percent T-type units of the formula $[R^2SiO_{3/2}]$; and the hydrosilylation-curable resin-linear organosiloxane block copolymer comprises from 0.5 to 4.5 mole percent of the $(C_1-C_{30})$hydrocarbyl comprising at least one aliphatic unsaturated bond.

3. The composition of claim 2 wherein the sulfur compound is a diorgano polysulfide of formula (II): $R^a$—$S$—$(S)_n$—$R^b$(II), wherein subscript n is 1, 2, or 3, each of $R^a$ and $R^b$ independently is an unsubstituted $(C_2-C_{30})$hydrocarbyl or a $(C_1-C_{30})$hydrocarbyl substituted with 1 or more substituents $R^C$, wherein each $R^C$ independently is halogen, —$NH_2$, —NHR, —$NR_2$, —$NO_2$, —OH, —OR, oxo (=O), —C≡N, —C(=O)—R, —OC(=O)R, —C(=O)OH, —C(=O)OR, —SH, —SR, —SSH, —SSR, —SC(=O)R, —$SO_2R$, —$OSO_2R$, —$SiR_3$, or —$Si(OR)_3$; wherein each R independently is an unsubstituted $(C_1-C_{30})$hydrocarbyl.

4. The composition of claim 1 wherein the composition has the sulfur compound described as constituent (iii-a); wherein the sulfur compound is a sulfur-functional organosiloxane of formula (I-a): $(R^3R^4SiO_{2/2})_b(O_{3/2}Si$—$R^6$—$S$—$(S)_m$—$R^7$—$SiO_{3/2})_d$ (I a), wherein b is from <1.00 to 0.80, d is from >0 to 0.20, each $R^3$ independently is $(C_1-C_6)$alkyl, and each $R^4$ independently is a $(C_1-C_6)$alkyl, phenyl, $(C_2-C_6)$alkenyl, or $(C_2-C_6)$alkynyl; m is 0, 1, 2, or 3; and each of $R^6$ and $R^7$ independently is a bond or a $(C_1-C_{10})$hydrocarbylene.

5. The composition of claim 4 wherein in formula (I-a) each $R^3$ independently is $(C_1-C_3)$alkyl and each $R^4$ independently is $(C_1-C_3)$alkyl or phenyl, with the proviso that on average, per molecule, at least one $R^4$ is phenyl; or in formula (I-a) m is 1; and each of $R^6$ and $R^7$ is a bond; or in formula (I-a) each $R^3$ independently is $(C_1-C_3)$alkyl and each $R^4$ independently is $(C_1-C_3)$alkyl or phenyl, with the proviso that on average, per molecule, at least one $R^4$ is phenyl; m is 1; and each of $R^6$ and $R^7$ is a bond.

6. The composition of claim 1, wherein when the composition has constituent (i-a), the sulfur compound is dihexyl disulfide; dioctadecyl disulfide; dioctadecyl trisulfide; dioctadecyl tetrasulfide; bis(2-butoxy-ethyl) disulfide; or 1 docosanethiol, or a combination of any two or more thereof;

and when the composition has constituent (iii-a), the sulfur compound is a sulfur-functional organosiloxane of formula $(T^{C3H6S-})_{0.090}T^{Ph}_{0.910}$.

7. The composition of claim 1 wherein: (a) the atomic amount of (ii) the metal component of a hydrosilylation catalyst is from greater than 0 to 100 ppm; or (b) (ii) the metal component of a hydrosilylation catalyst is palladium, platinum, rhodium, ruthenium, or a combination of any two or more thereof; or (c) (ii) the metal component of a hydrosilylation catalyst is platinum or rhodium; or (d) (ii) the metal component of a hydrosilylation catalyst is platinum, and the atomic amount of platinum is from 0.1 to 5 ppm of the composition.

8. The composition of claim 1 being substantially solvent free.

9. An optical and/or electronic device comprising the composition of claim 1 or a hydrosilylation cured product made therefrom.

10. A thermally aged hydrosilylation-cured polymer product comprising a product of heating the composition of claim 1 at a temperature of from 100° to 300° C. for a period of time of at least 5 minutes to give the thermally aged hydrosilylation-cured polymer product.

11. A hydrosilylation reactable composition comprising reactants (A) and (B), a catalyst (C), and constituent (D):
(A) a polyorganosiloxane having on average per molecule at least two aliphatically unsaturated aliphatic groups;
(B) a SiH functional organosiloxane crosslinker having on average at least two SiH functional groups per molecule;
(C) a hydrosilylation reaction catalyst containing an atomic amount of a metal; and
(D) a sulfur-functional organosiloxane of formula (I): $(R^3R^4R^5SiO_{1/2})_{a1}(R^3R^4SiO_{2/2})_{b1}(R^3SiO_{3/2})_{c1}(O_{3/2}Si-R^6-S-(S)_m-R^7-SiO_{3/2})_{d1}(SiO^{4/2})_{e1}$ (I), wherein subscript m is 0, 1, 2, or 3; subscripts a1+b1+c1+d1+e1=1, a1 is from 0 to 0.5, b1 is from 0 to <1, c1 is from 0 to 1, d1 is from 0 to 1, and e1 is from 0 to 0.2;
wherein each of $R^3$, $R^4$, and $R^5$ independently is a $(C_1-C_{30})$hydrocarbyl, mercapto-functional ((HS)-functional) $(C_1-C_{30})$hydrocarbyl, or a $(C_1-C_{30})$heterohydrocarbyl containing a sulfide group, a disulfide group, a trisulfide group, or a tetrasulfide group; and
wherein each of $R^6$ and $R^7$ independently is a bond, a $(C_1-C_{30})$hydrocarbylene, or a $(C_1-C_{30})$heterohydrocarbylene containing a sulfide group, a disulfide group, a trisulfide group, or a tetrasulfide group; and
with the proviso that d1 is >0 or at least one of $R^3$, $R^4$, and $R^5$ independently is a mercapto-functional $(C_1-C_{30})$hydrocarbyl or a $(C_1-C_{30})$heterohydrocarbyl containing a sulfide group, a disulfide group, a trisulfide group, or a tetrasulfide group.

\* \* \* \* \*